(12) United States Patent
Sattler

(10) Patent No.: US 11,513,134 B2
(45) Date of Patent: Nov. 29, 2022

(54) CONTAINER FOR RECEIVING VESSELS FOR USE IN AN AUTOMATED ANALYZER

(71) Applicant: Roche Diagnostics Operations, Inc., Indianapolis, IN (US)

(72) Inventor: Stephan Sattler, Penzberg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 427 days.

(21) Appl. No.: 16/869,661

(22) Filed: May 8, 2020

(65) Prior Publication Data

US 2020/0363440 A1 Nov. 19, 2020

(30) Foreign Application Priority Data

May 16, 2019 (EP) .................................. 19174945

(51) Int. Cl.
    *G01N 35/02* (2006.01)
    *B01L 3/00* (2006.01)
    *G01N 35/04* (2006.01)
    *G01N 35/00* (2006.01)

(52) U.S. Cl.
CPC ............ *G01N 35/025* (2013.01); *B01L 3/523* (2013.01); *G01N 35/04* (2013.01); *G01N 2035/00287* (2013.01); *G01N 2035/0405* (2013.01)

(58) Field of Classification Search
CPC .................. G01N 35/025; G01N 35/04; G01N 2035/00287; G01N 2035/0405; B01L 3/523

See application file for complete search history.

(56) References Cited

U.S. PATENT DOCUMENTS

| 10,471,433 B1 | 11/2019 | Bell |
| 2012/0328475 A1 | 12/2012 | Sakairi et al. |
| 2018/0188275 A1 | 7/2018 | Noda et al. |

FOREIGN PATENT DOCUMENTS

| EP | 1507593 B1 | 10/2007 |
| JP | S64-61667 A | 3/1989 |
| JP | 2010-127936 A | 6/2010 |

OTHER PUBLICATIONS

Machine Translation of JP2594965B2, pp. 1-4 (Year: 2013).*

* cited by examiner

*Primary Examiner* — Jennifer Wecker
*Assistant Examiner* — Ali Husain Faraz
(74) *Attorney, Agent, or Firm* — Roche Diagnostics Operations, Inc.

(57) ABSTRACT

A container for receiving vessels for use in an automated analyzer is presented. The container comprises a wall assembly including a first wall and a second wall. The wall assembly forms a receptacle for receiving a vessel having one or more covers or lids. At least one of the first and second walls moves to provide a first open configuration for receiving the vessel and a second closed configuration. The container further comprises an actuator configured to translate the vessel from a first position after being received in the container to a second position and the wall assembly in the second closed configuration is positioned so that at least one engaging element attached to the wall assembly engages with the covers or lids of the vessel to open the covers or lids while the vessel is being translated by the actuator from the first position to the second position.

19 Claims, 22 Drawing Sheets

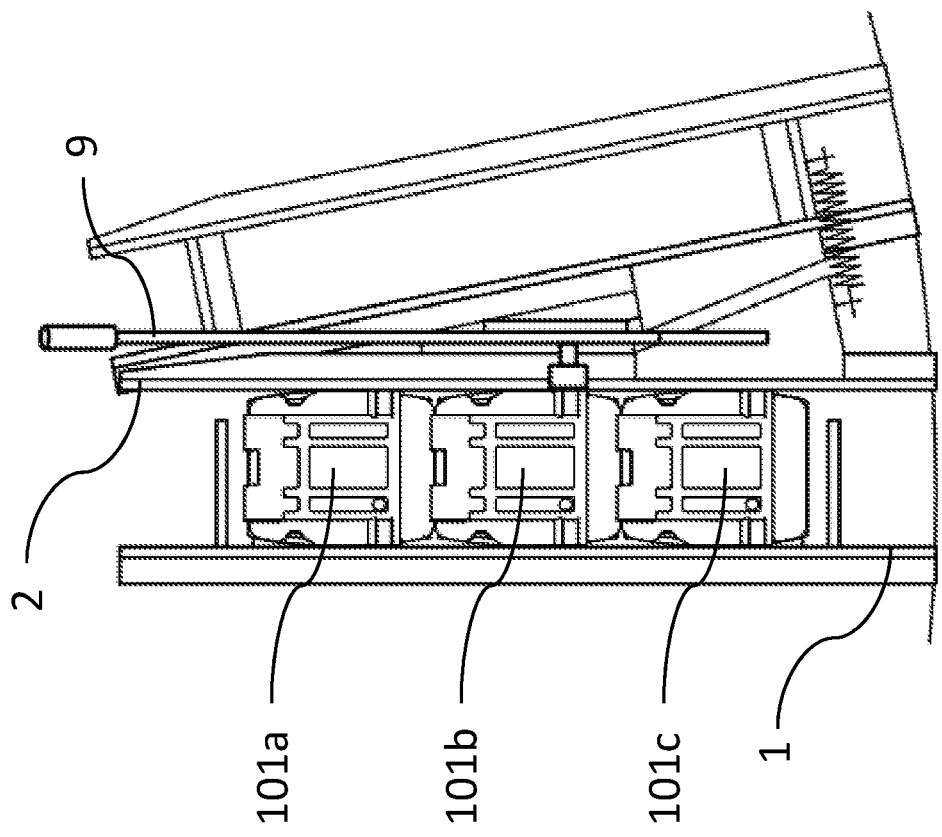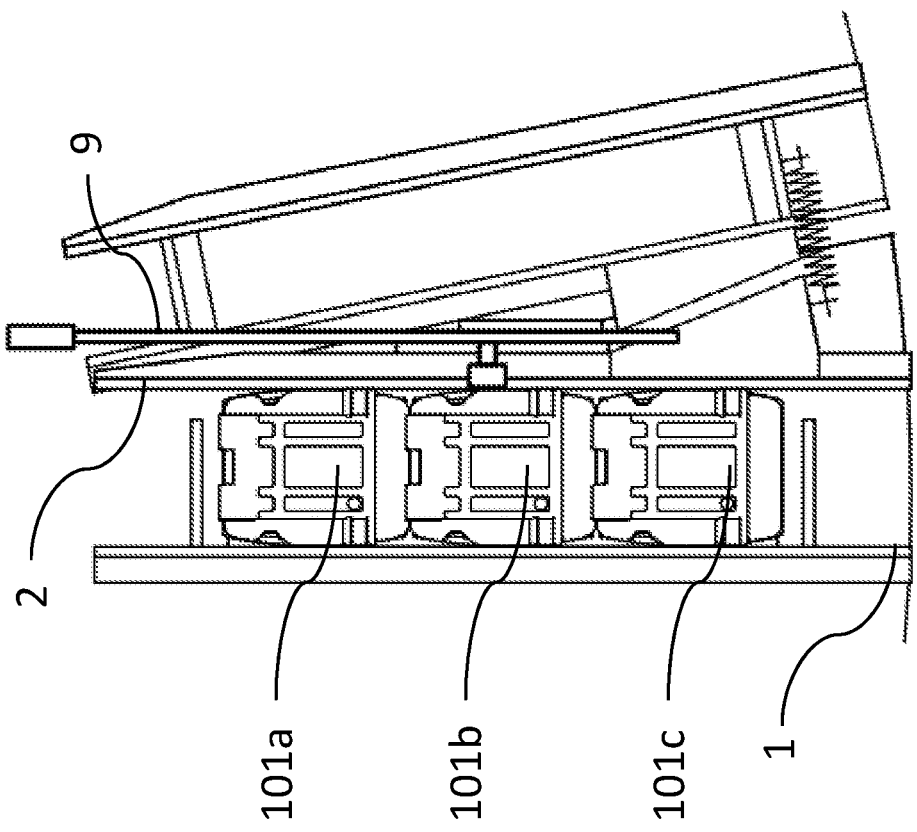

CONTAINER FOR RECEIVING VESSELS FOR USE IN AN AUTOMATED ANALYZER

CROSS-REFERENCE TO RELATED APPLICATIONS

This application claims priority to EP 19174945.6, filed May 16, 2019, which is hereby incorporated by reference.

BACKGROUND

The present disclosure generally relates to containers for receiving vessels for use in an automated analyzer.

Automated analyzers (e.g., in-vitro analyzers) are widespread in today's laboratory and hospital environments. Automated analyzers can require a considerable number of consumables during operation. For instance, multiple types of reagents can be consumed in the assays or tests the automated analyzer carries out. These reagents or other consumables are frequently supplied in vessels, which have to be inserted into the automated analyzer and removed from the automated analyzer regularly. Moreover, the vessels can have covers, or lids, which have to be opened before the reagent or consumable can be consumed by the automated analyzer.

Therefore, there is a need for the processes of inserting and removing the vessels, as well as opening the covers and lids, happen in a simple but error-free manner.

SUMMARY

According to the present disclosure, a container for receiving vessels for use in an automated analyzer is presented. The container can comprise a wall assembly comprising a first wall and a second wall. The wall assembly can form a receptacle for receiving a vessel having one or more covers. At least one of the first and second walls can be moveable to provide a first open configuration for receiving the vessel and a second closed configuration. The container can also comprise an actuator. The actuator can be configured to translate the vessel from a first position after being received in the container to a second position. The wall assembly in the second closed configuration can be positioned so that at least one engaging element attached to the wall assembly can engage with the covers of the vessel to open the covers while the vessel is being translated by the actuator from the first position to the second position.

Accordingly, it is a feature of the embodiments of the present disclosure to provide for the processes of inserting and removing the vessels, as well as opening the covers and lids, happen in a simple but error-free manner. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIGS. 13A-15 illustrate a container arranged on a reagent rotor according to an embodiment of the present disclosure.

DETAILED DESCRIPTION

Figure 1:
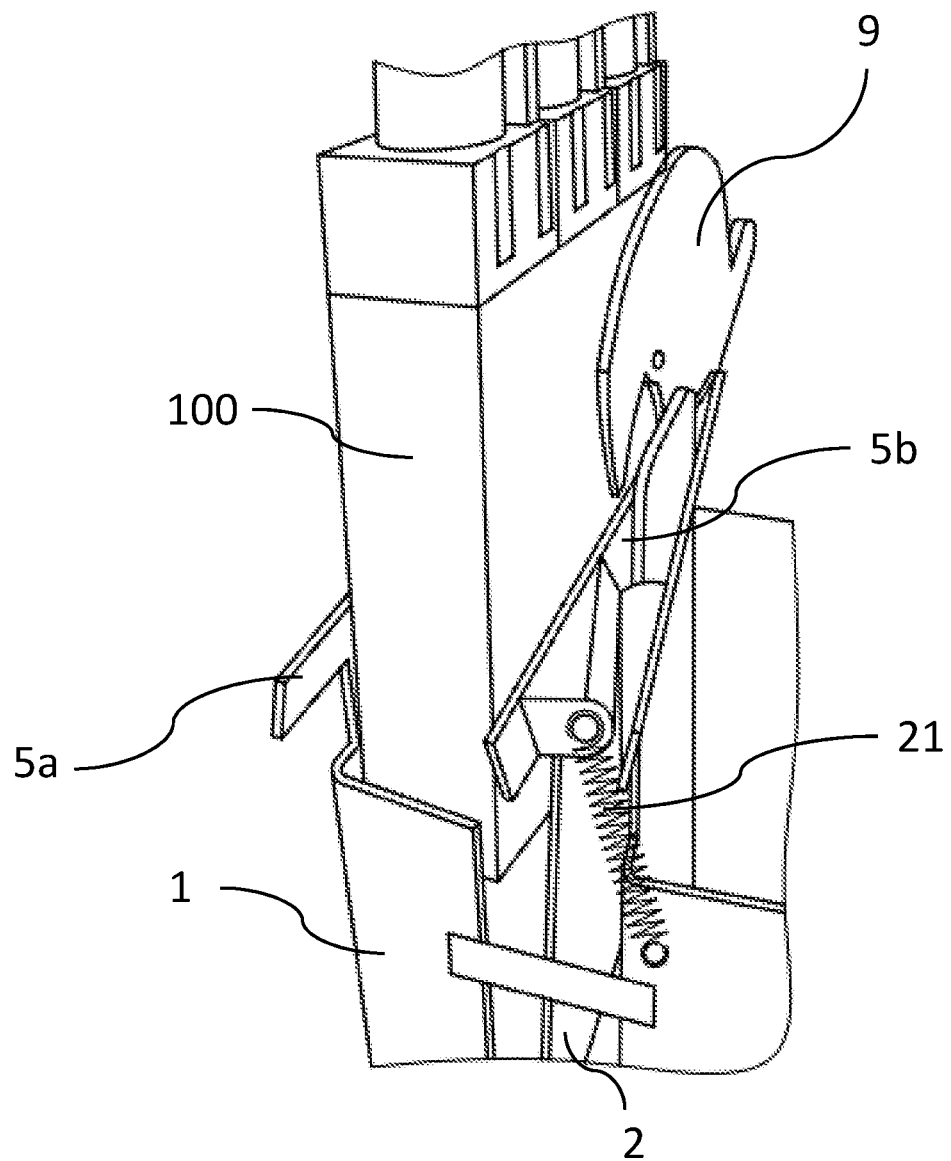
FIG. 1 illustrates a perspective view of a container according to an embodiment of the present disclosure.
Figure 2:
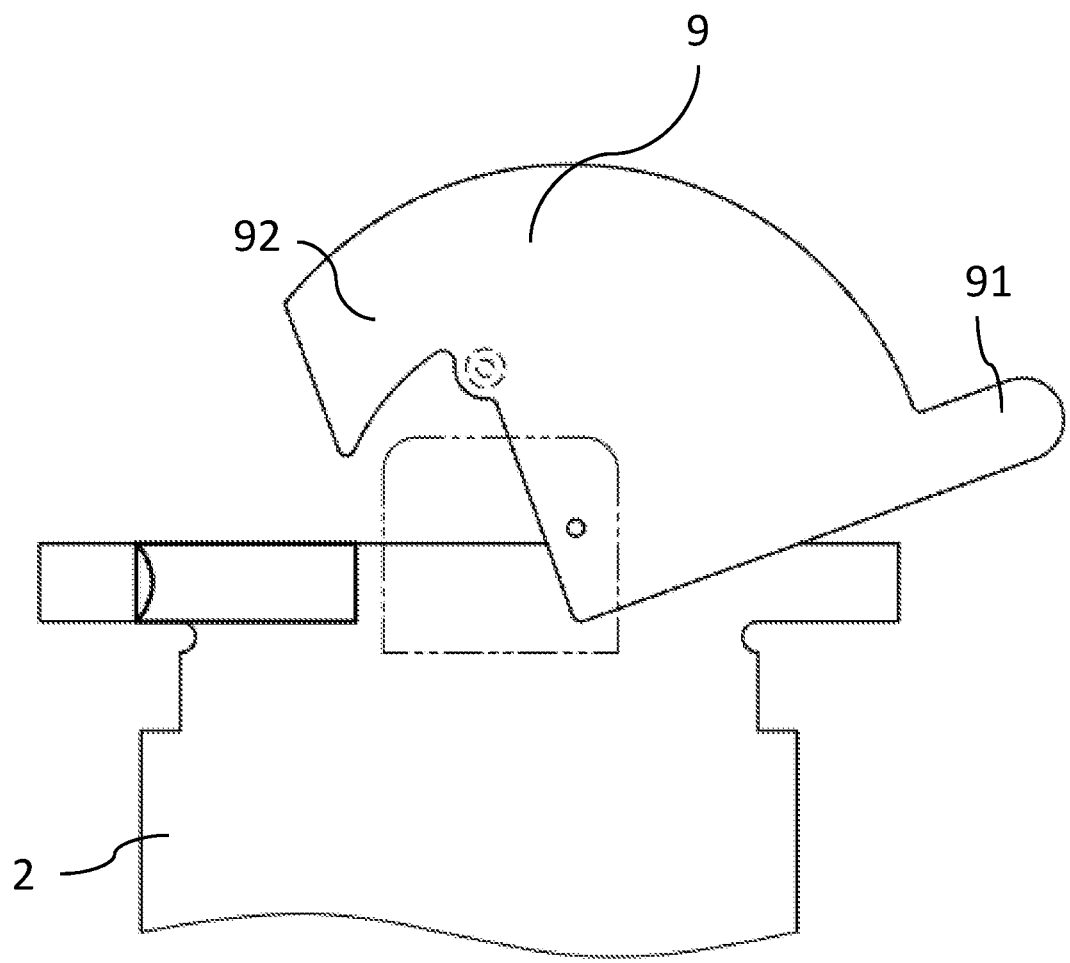
FIGS. 2 and 3 illustrate the operation of a container according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A container for receiving vessels for use in an automated analyzer is disclosed. The container can include a wall assembly having a first wall and a second wall, the wall assembly forming a receptacle for receiving a vessel having one or more covers, or lids. At least one of the first and second walls can be moveable to provide a first open configuration for receiving the vessel and a second closed configuration. The container can further include an actuator being configured to translate the vessel from a first position after being received in the container to a second position. The wall assembly in the second closed configuration can be positioned so that at least one engaging element attached to the wall assembly can engage with the covers, or lids, of the vessel to open the covers, or lids, while the vessel is being translated by the actuator from the first position to the second position.

An automated analyzer comprising one or more of the above containers is also presented.

The containers of the first and second general aspects can have advantageous technical effects.

Firstly, the container can be relatively compact and simple. The actuator and the elements co-operating with the actuator for effecting the movement of the vessel and opening the covers, or lids, can comprise of relatively simple mechanical elements (e.g., spring-biased, transversely moving plates) which can be arranged in a compact manner. This can allow integration of the containers of the present disclosure in a space-saving manner in automated analyzers (e.g., on rotors of automated analyzers). Moreover, the components of the wall assembly can be made from relatively simple sheet elements, e.g. metal sheets.

Secondly, the actuator can facilitate a simple and fault-tolerant operation of opening the lids, or covers. For example, a single manual manipulation of the actuator (e.g., rotating or translating the actuator) can be sufficient to move the vessel into the second position (for extraction of its content by the automated analyzer) and to open the lids, or covers.

Thirdly, the container can provide vessel insertion and removal positions for conveniently inserting and removing the vessels. In one embodiment, a further manipulation of the actuator can move the vessel from the second position after its content has been consumed into a position in which it can be easily grasped and removed by an operator.

Several terms are used can have a particular meaning in the present disclosure.

An "analyzer" according to the present disclosure can be an at least partially automated apparatus dedicated to perform an analytical function. In some examples, the analyzers can be configured to carry out the analysis of samples (e.g., samples for in vitro diagnostics). For example, an analyzer can be a clinical diagnostics system for performing in-vitro diagnostics.

The analyzers of the present disclosure can have different configurations according to the need and/or according to the desired workflow. Additional configurations may be obtained by coupling a plurality of apparatuses and/or modules together. A "module" can be a work cell, typically smaller in size than the entire analyzer, which can have a dedicated function. This function can be analytical but can be also pre-analytical or post-analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps.

In particular, the analyzers can comprise one or more analytical devices, designed to execute respective workflows that are optimized for certain types of analysis. The analyzer can include analytical apparatuses for one or more of clinical chemistry, immunochemistry, coagulation, hematology, and the like. Thus, the analyzer may comprise one analytical apparatus or a combination of any of such analytical apparatuses with respective workflows, where pre-analytical and/or post analytical modules may be coupled to individual analytical apparatuses or be shared by a plurality of analytical apparatuses. Alternatively, pre-analytical and/or post-analytical functions may be performed by units integrated in an analytical apparatus. The analyzer can comprise functional units such as liquid handling units for pipetting and/or pumping and/or mixing of samples and/or reagents and/or system fluids, and also functional units for sorting, storing, transporting, identifying, separating, detecting.

The term "sample" can refer to a biological material suspected of containing one or more analytes of interest and whose detection, qualitative and/or quantitative, may be associated to a particular condition (e.g., a clinical condition).

The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents e.g., to enable carrying out one or more in vitro diagnostic tests, or for enriching (extracting/separating/concentrating) analytes of interest and/or for removing matrix components potentially interfering with the detection of the analyte(s) of interest.

The term "sample" can be used to indicate a sample before sample preparation whereas the term "prepared sample" can be used to refer to samples after sample preparation. In non-specified cases, the term "sample" may generally indicate either a sample before sample preparation or a sample after sample preparation or both. Examples of analytes of interest are vitamin D, drugs of abuse, therapeutic drugs, hormones, and metabolites in general. The list is however not exhaustive.

In particular, the analyzer can comprise a sample preparation station for the automated preparation of samples. A "sample preparation station" can be a pre-analytical module coupled to one or more analytical apparatuses or a unit in an analytical apparatus designed to execute a series of sample processing steps aimed at removing or at least reducing interfering matrix components in a sample and/or enriching analytes of interest in a sample. Such processing steps may include any one or more of the following processing operations carried out on a sample or a plurality of samples, sequentially, in parallel or in a staggered manner: pipetting (aspirating and/or dispensing) fluids, pumping fluids, mixing with reagents, incubating at a certain temperature, heating or cooling, centrifuging, separating, filtering, sieving, drying, washing, re-suspending, aliquoting, transferring, storing and so on.

A "consumable" can be any disposable item that can be used and replenished on a regular basis during operation of the analytical device. For example, a consumable may include reagents or other substances required for carrying out tests or assays at the analytical device. In other examples, consumables can include hardware which may be only used once or a limited amount of times (e.g., reaction vessels or other types of vessels or instrument tips).

A "reagent" can be a substance used for treatment of a sample in order e.g., to prepare a sample for analysis, to enable a reaction to occur, or to enable detection of a physical parameter of the sample or analyte contained in the sample. In particular, a reagent can be a substance that is or comprises a reactant, typically a compound or agent capable e.g., of binding to or chemically transforming one or more analytes present in a sample or an unwanted matrix component of the sample. Examples of reactants are enzymes, enzyme substrates, conjugated dyes, protein-binding molecules, ligands, nucleic acid binding molecules, antibodies, chelating agents, promoters, inhibitors, epitopes, antigens, and the like. However, the term reagent can be used to include any fluid that can be added to a sample including a dilution liquid, including water or other solvent or a buffer solution, or a substance that can be used for disruption of specific or nonspecific binding of an analyte to a protein, binding proteins or surfaces. Sample may be provided for example in sample containers such as sample tubes, including primary tubes and secondary tubes, or multi-well plates, or any other sample carrying support. Reagents may be arranged for example in the form of containers or cassettes containing individual reagents or group of reagents and placed in appropriate receptacles or positions within a storage compartment or conveyor. Other types of reagents or system fluids may be provided in bulk containers or via a line supply.

Unless specified differently in the respective context, the terms "about" in connection with values for parameters can mean to include a deviation of +/−10% from the specified value in the present disclosure.

First, an overview of the configuration and functionality of the containers of the present disclosure will be given in connection with FIGS. 1-7. Subsequently, the components of the containers of the present disclosure will be further explained in connection with FIGS. 8-12. Additional embodiments of the containers of the present disclosure will be discussed in connection with FIGS. 13A-22.

General Overview

FIG. 1 is a perspective view of an example container according to the present disclosure. The container can comprise a wall assembly including a first wall 1 and a second wall 2. The wall assembly can form a receptacle for receiving a vessel 100 having one or more covers, or lids. At least one of the first and second walls 1, 2 can be moveable to provide a first open configuration for receiving the vessel 100 and a second closed configuration. FIG. 1 shows the container in the first open configuration, while the vessel 100 can be inserted. In the example of FIG. 1, the second wall 2 can be moveable (e.g., pivotable) to provide the open and closed configurations.

The container can further comprise an actuator 9, the actuator 9 being configured to translate the vessel 100 from a first position after being received in the container to a second position. This operation can be seen in FIGS. 2-7. In the example, the actuator 9 can be a rotatably arranged actuator, which can be rotated to effect the translation of the vessel 100 (and possibly other functions of the container as described below). The actuator 9 can be manually operable in some examples. For instance, the actuator can have a gripping element 91 (see FIG. 2). The gripping element 91 can grip the gripping element 91 and rotate the actuator 9. As depicted, the actuator 9 can be an excentre (i.e., its center of gravity in a plane substantially perpendicular to its axis of rotation can be spaced apart from a position in which the axis of rotation intersects the plane).

As will be discussed herein, the actuator 9 can effect different movements of components of the container to provide different functions.

The wall assembly in the second closed configuration can be positioned so that at least one engaging element 5a, 5b attached to the wall assembly can engage with the covers, or lids, 101a of the vessel 100 to open the covers, or lids, while the vessel is being translated by the actuator 9 from the first position to the second position.

Figure 3:
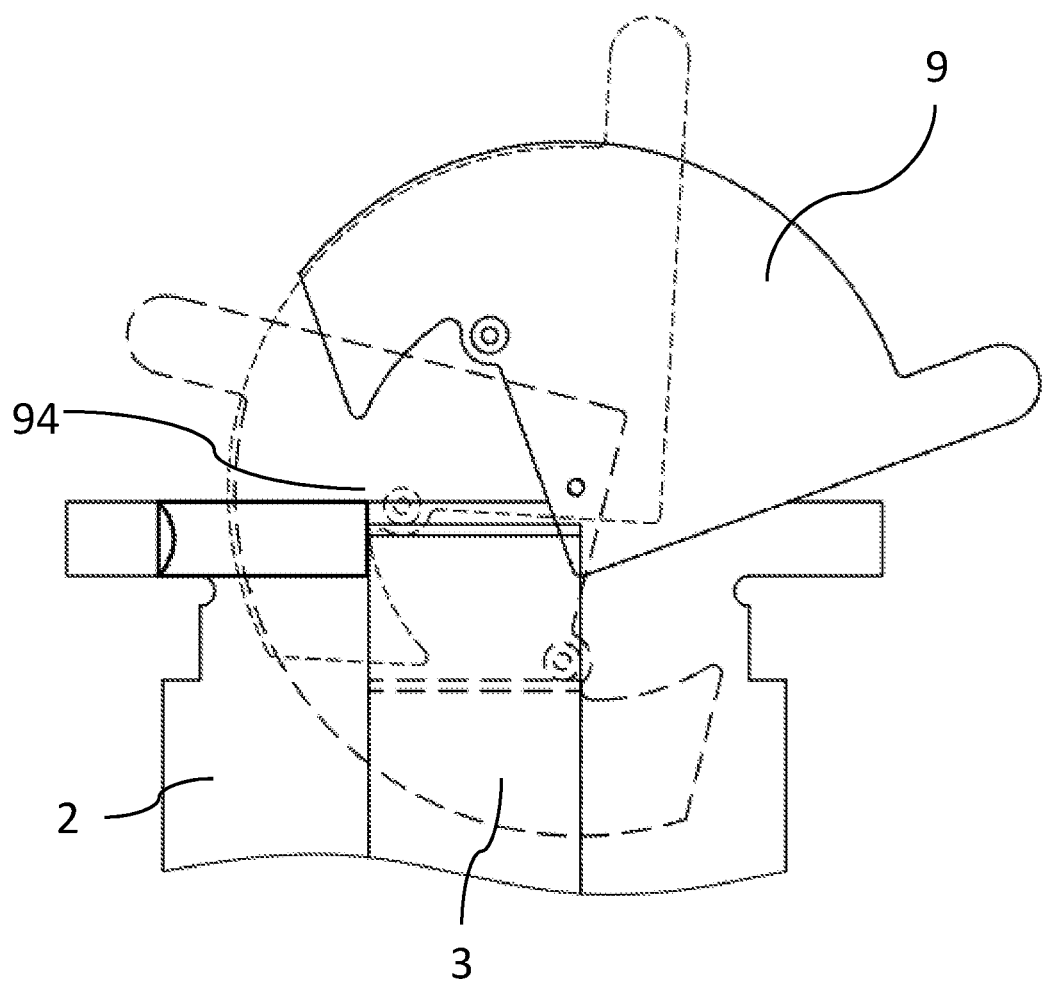

This operation is illustrated in FIG. 3: The actuator 9 is depicted in FIG. 3 in different positions during the manipulation of the actuator 9. The first position is a position for inserting the vessel (the actuator 9 is drawn in solid lines in this position in FIG. 3). After an operator has inserted a vessel into the container (not shown in FIG. 3), he/she can move the actuator 9 into a second position (the actuator 9 is drawn in broken lines with longer dashes in this position in FIG. 3). In this second position, the actuator can engage with a pusher 3.

The actuator can have a suitable (actuator) engagement element 94 for this purpose. For example, the engagement element 94 can be a peg or journal. Upon further rotation of the actuator 9, the pusher 3 can be moved transversely (e.g., downwards in the example of FIG. 3) and can engage with the vessel to translate the vessel. The engagement element 94 can slide over the pusher 3 during this operation. Finally, the vessel can arrive in the second position (the actuator 9 is drawn in broken lines with longer dashes in this position in FIG. 3). As discussed below, the pusher 3 and the actuator can be locked in this second position while the analyzer consumes the content of the vessel.

The above discussed translation movement of the vessel can result in opening the lids, or covers, of the vessel. This can be seen in the sequence of FIGS. 4-8, which again show the container at different stages of the movement of the actuator 9.

Figure 4:
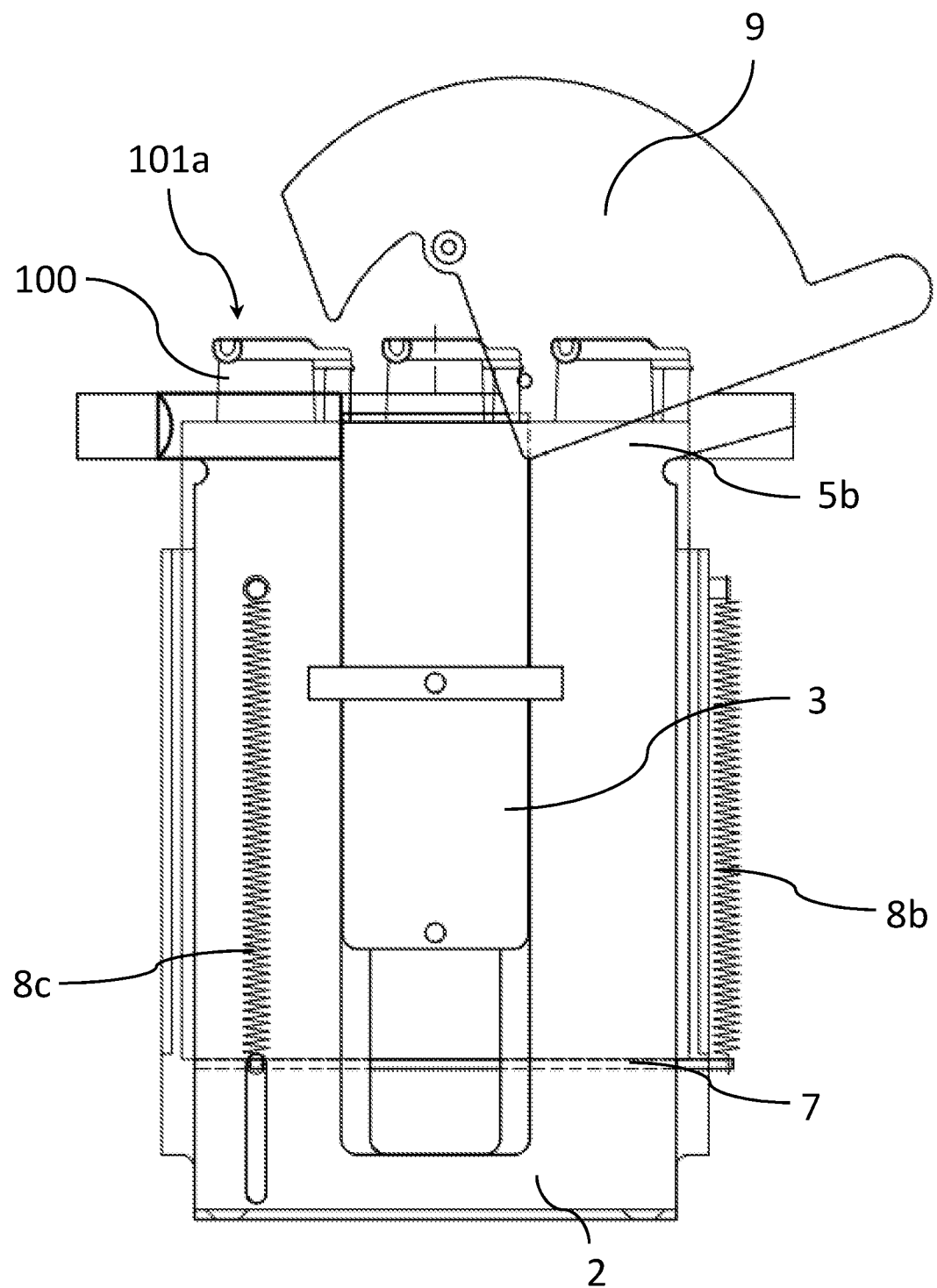
FIGS. 4-7 illustrate the operation of a container according to another embodiment of the present disclosure.
Figure 5:
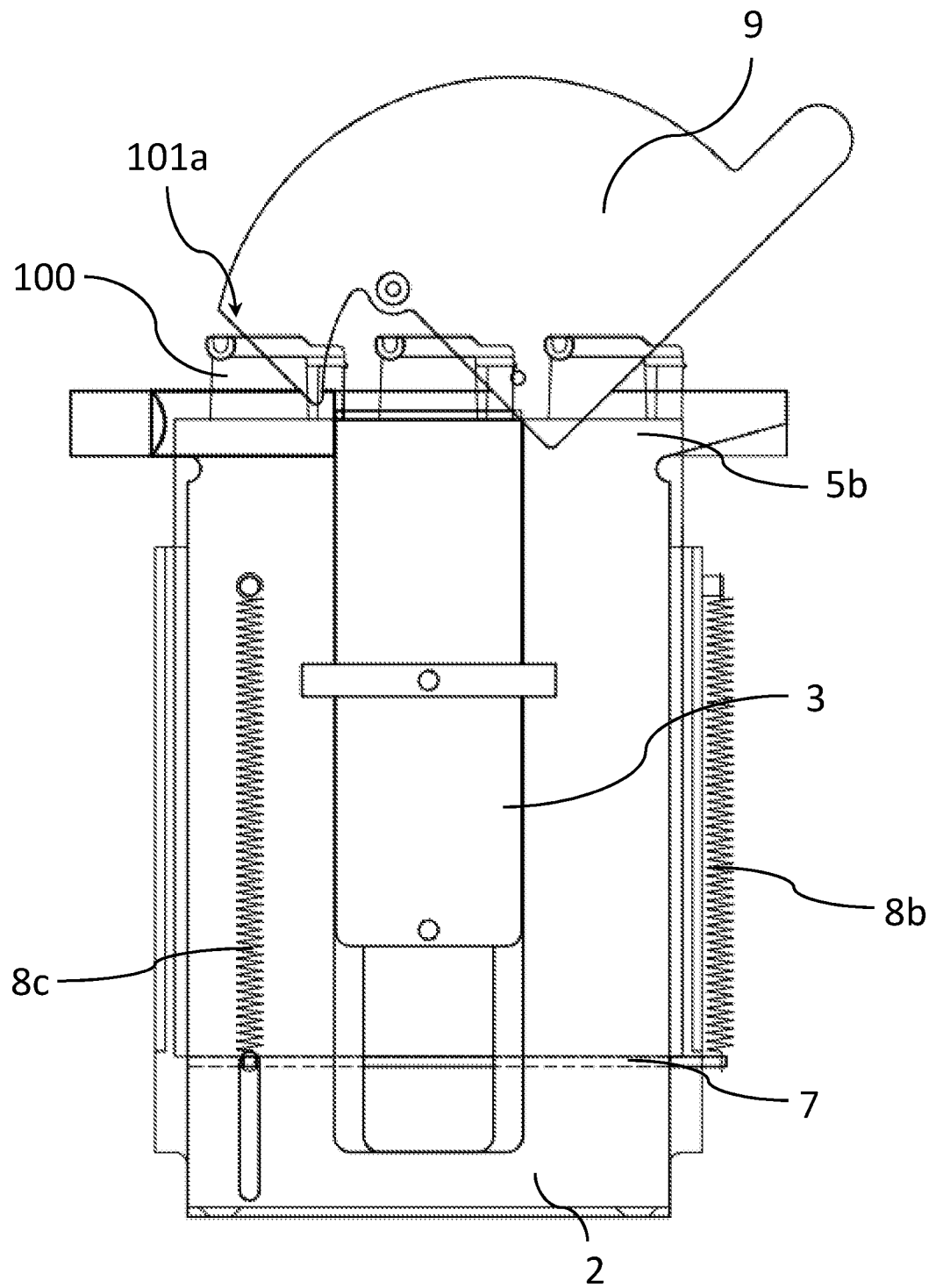

FIG. 4 shows the container after a vessel 100 has been inserted into the receptacle formed by the wall assembly (i.e., in the first position). The wall assembly can be configured to arrange the vessel in a predetermined position when the vessel can be inserted in the first open configuration of the wall assembly (for example, a platform can be provided on which the vessel rests in the first position when the wall assembly is in the first open configuration). As can be seen, the vessel 100 can have multiple covers, which can rotate to open the respective interior chamber of the vessel. One cover 101a of the multiple covers is indicated in FIG. 4 for the sake of illustration.

Figure 6:
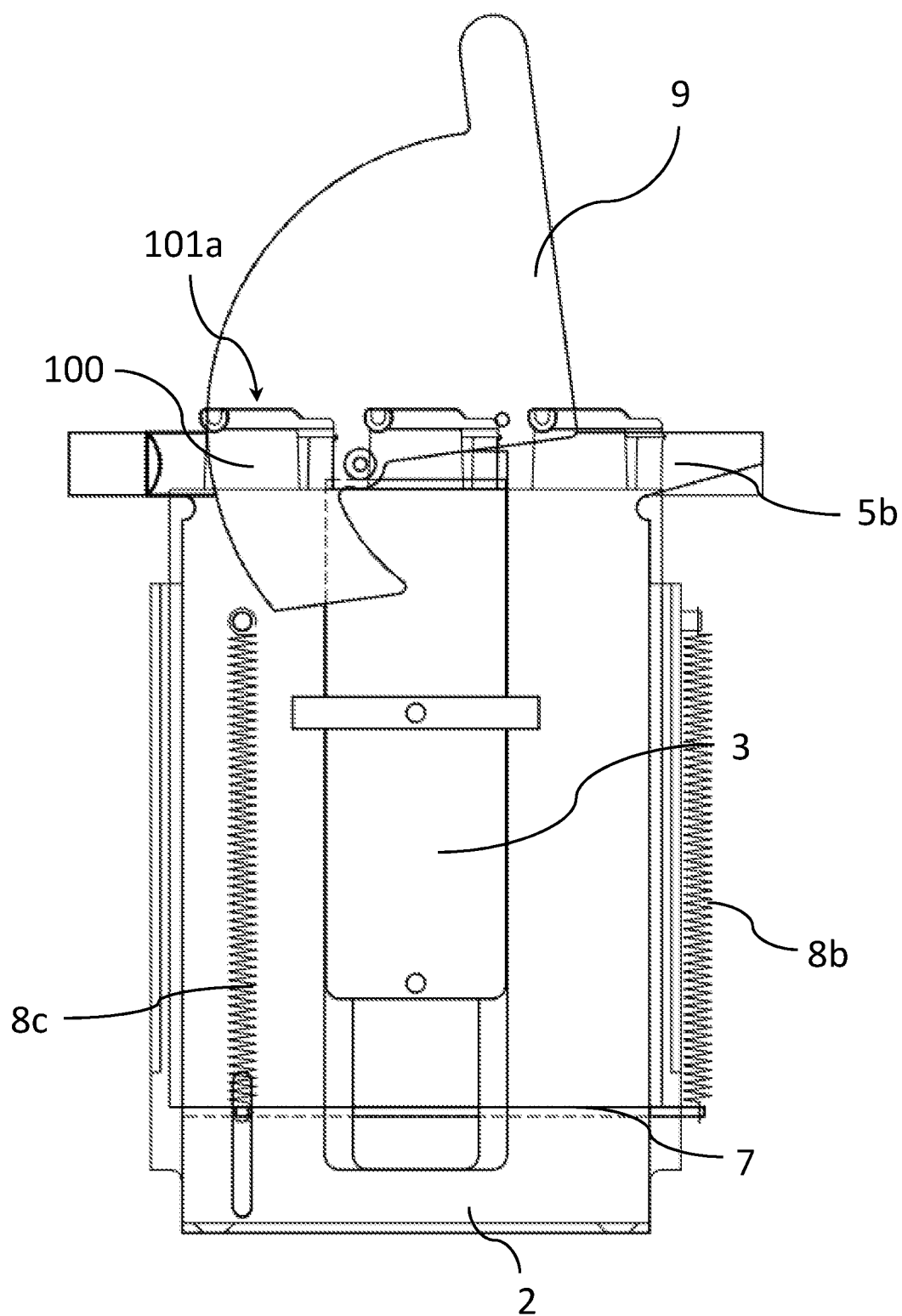

The operator can rotate the actuator 9 to a position where it can come into contact with the pusher 3 (see FIG. 6). Upon further rotation of the actuator 9, the pusher 3 can push the vessel 100 downward (in a vertical direction). During this process, the engagement element 5b of the second wall 2 can engage with the covers 101a of the vessel 100 and can rotate the covers 101a into an open position (see FIG. 7).

Figure 7:
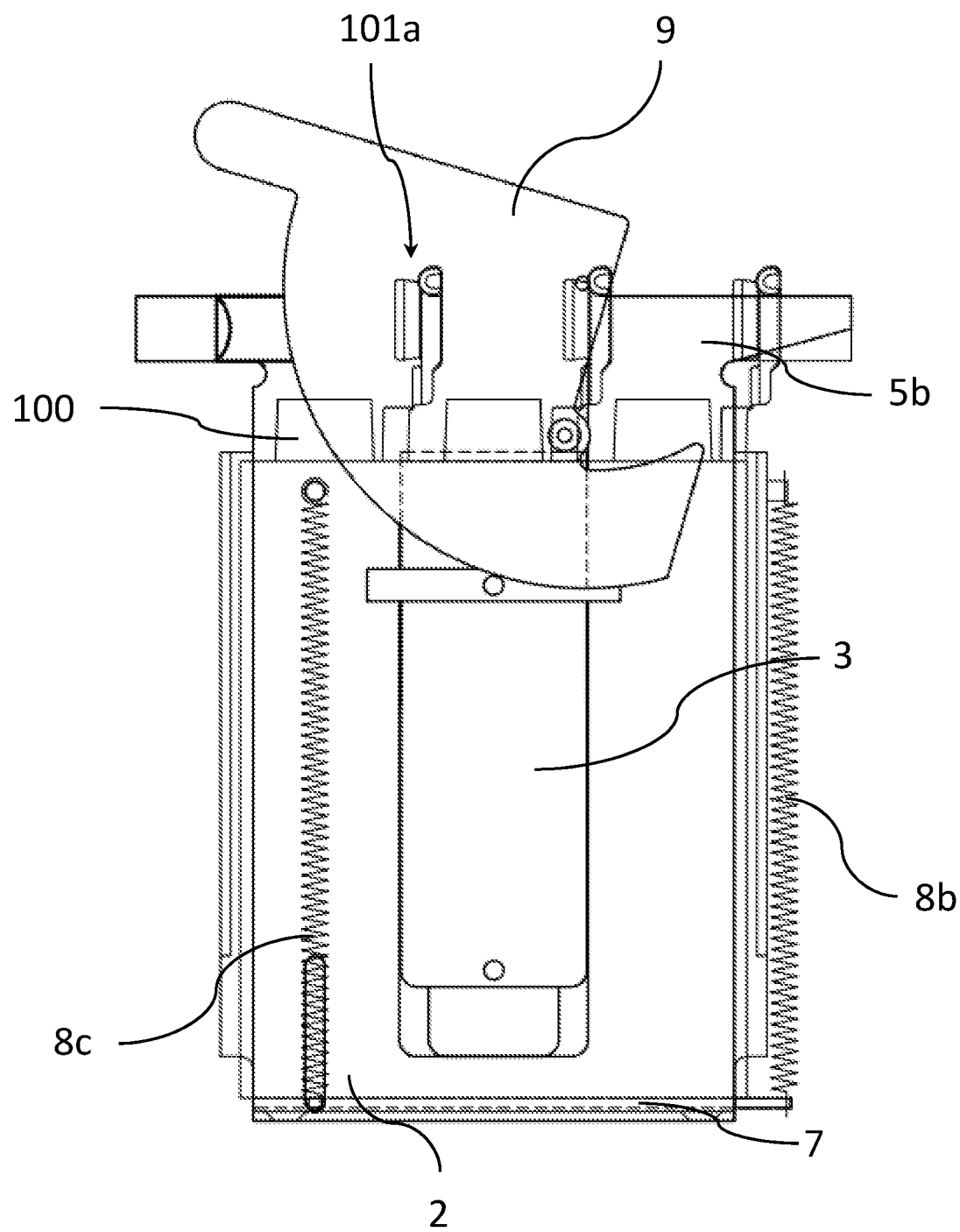

As shown in FIG. 7, the container further comprise a platform 7 supporting the vessel 100 in the second position. The platform 7 can also support the vessel 100 during the translation movement and/or in the first position. In some examples, the platform 7 can define the first position of the vessel 100. An operator can insert the vessel 100 into the receptacle by sliding it downwards until a bottom side of the vessel comes to rest on the platform 7.

The platform 7 can be connected to the container by one or more resilient elements 8b, 8c (e.g., springs). The one or more resilient elements 8b, 8c can be biased when the vessel 100 is supported in the second position.

In the example of FIG. 7, a first spring 8c can be coupled to the second wall 2 and a second spring 8b can be coupled to the first wall 1. The platform 7 can move towards the first position as soon as the actuator 9 is returned to its initial position (see FIG. 4). This can, in turn, move the vessel 100 in an upward direction so that it can be easily removed from the receptacle formed by the container (e.g., after the consumables contained in the vessel have been consumed). For example, the resilient elements 8b, 8c can return to an unbiased (or less biased) state to move the platform 7 and, with it, the vessel out of the second position towards the first position.

As described above, at least one of the first and second walls 1, 2 of the container can be moveable to provide a first open configuration for receiving the vessel and a second closed configuration.

Figure 16:
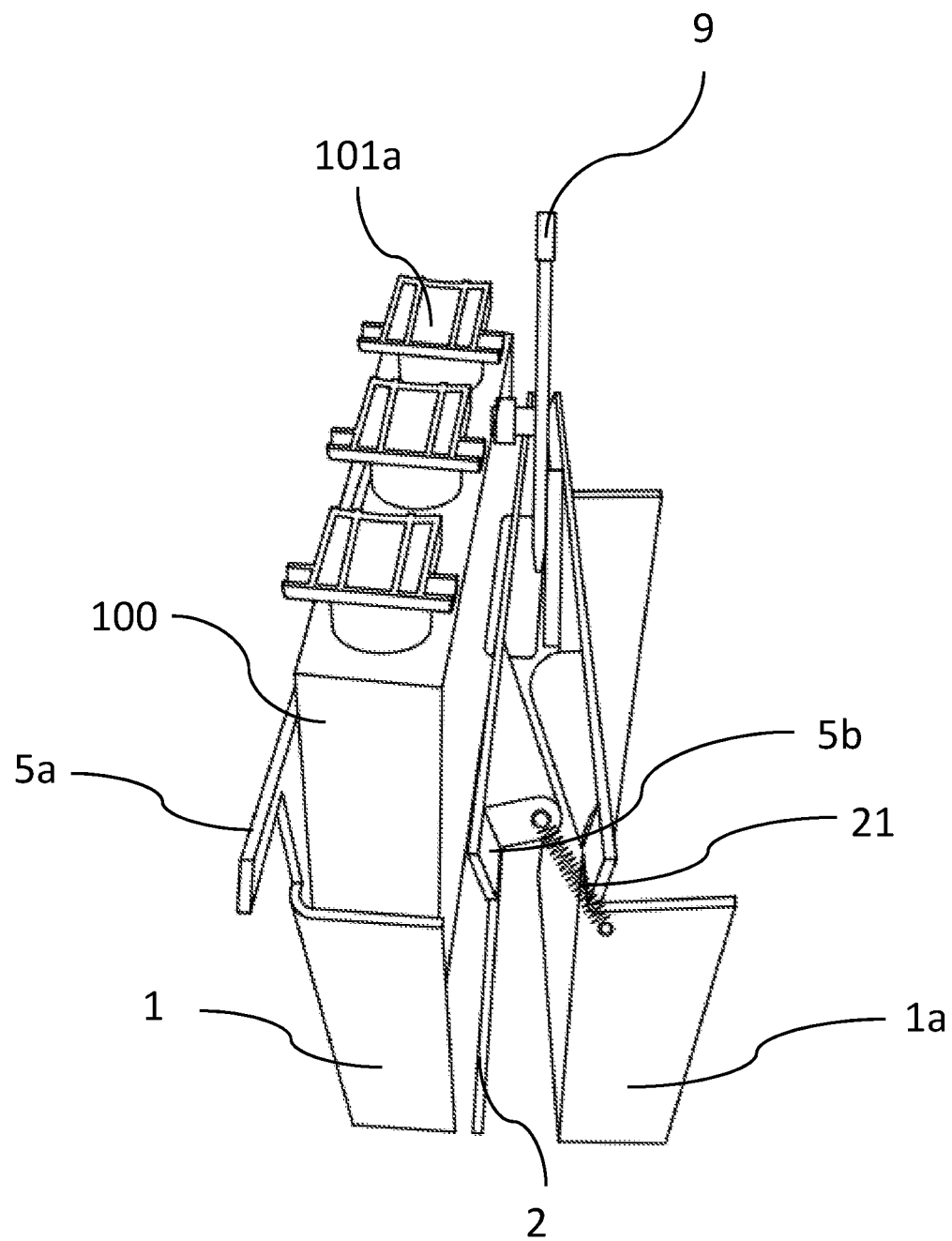
FIGS. 16-22 illustrate perspective views illustrating a vessel insertion, lid opening and vessel removal process when using a container according to an embodiment of the present disclosure.
Figure 17:
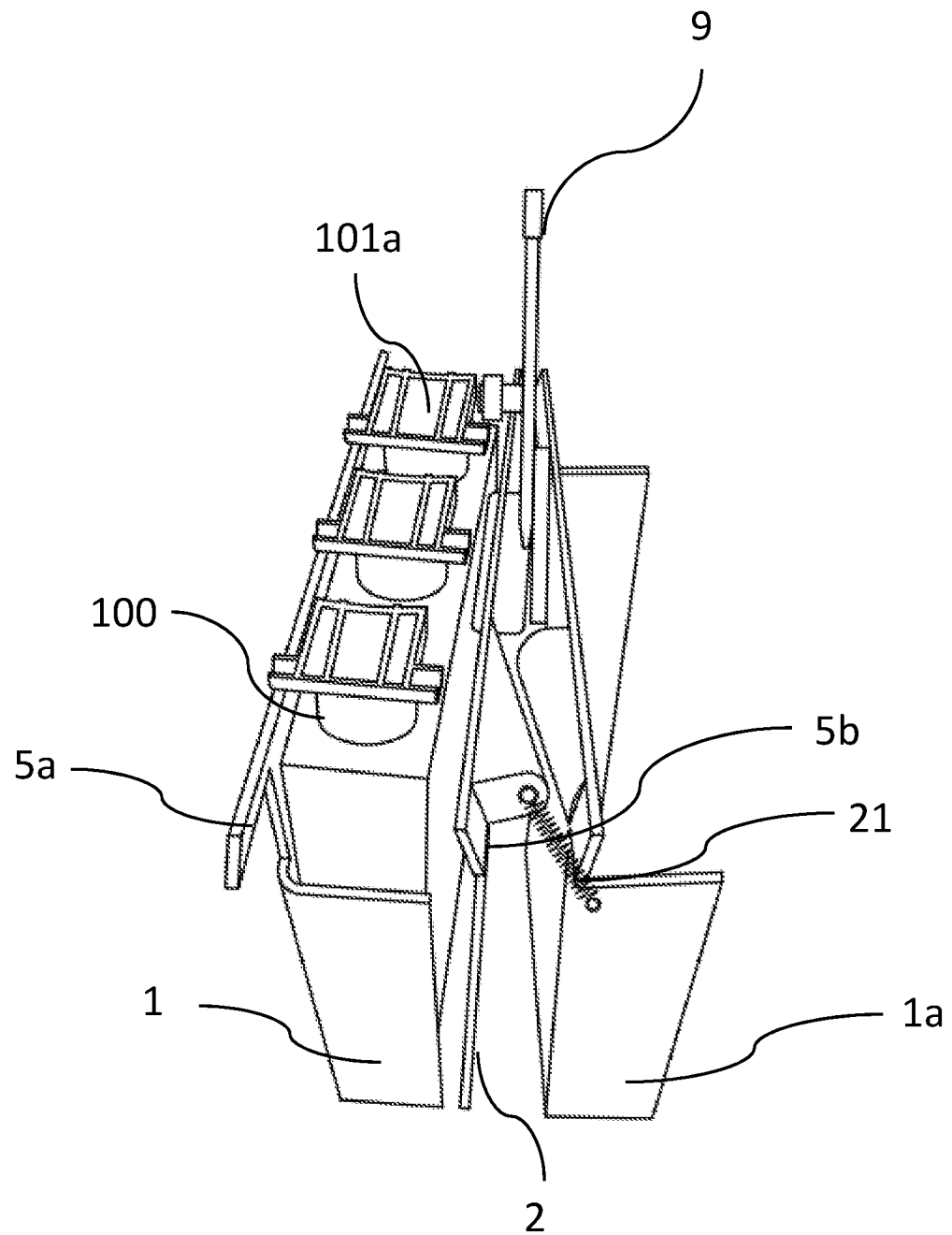
Figure 18:
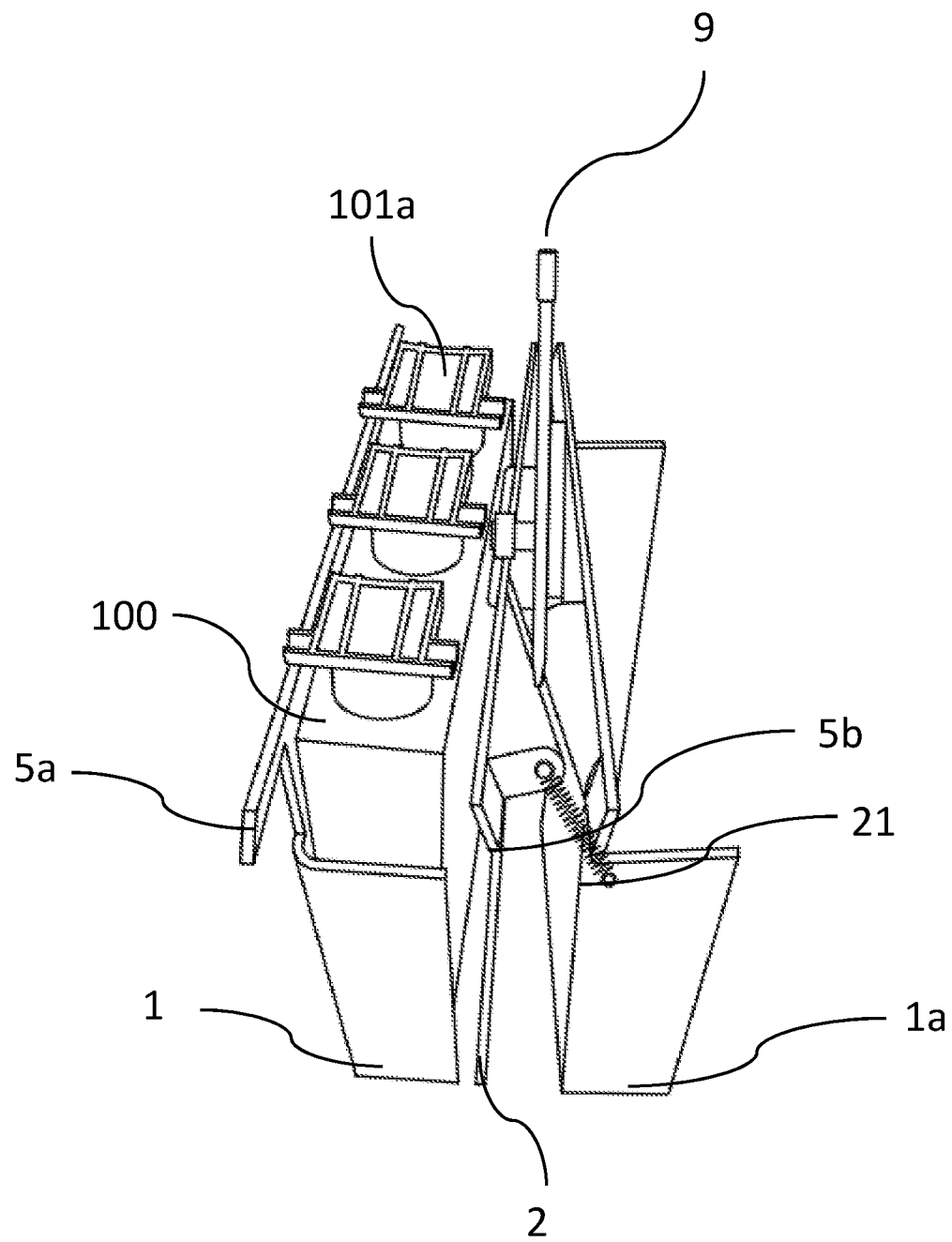
Figure 19:
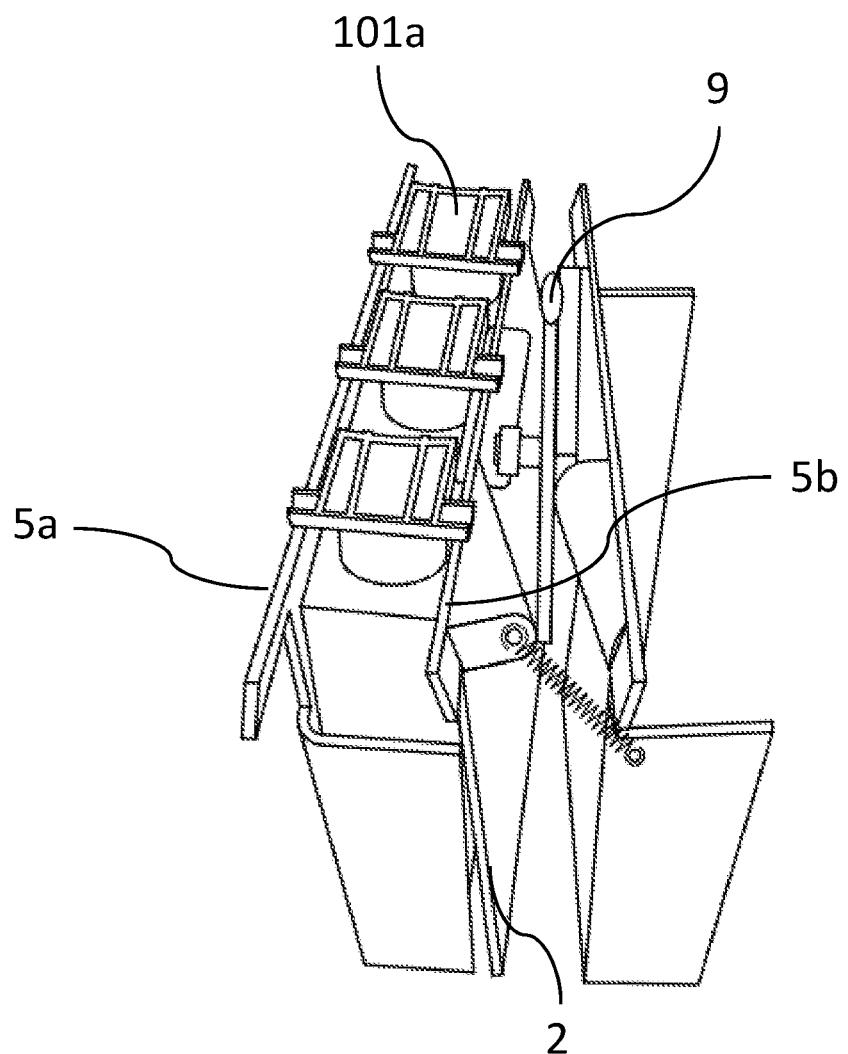
Figure 20:
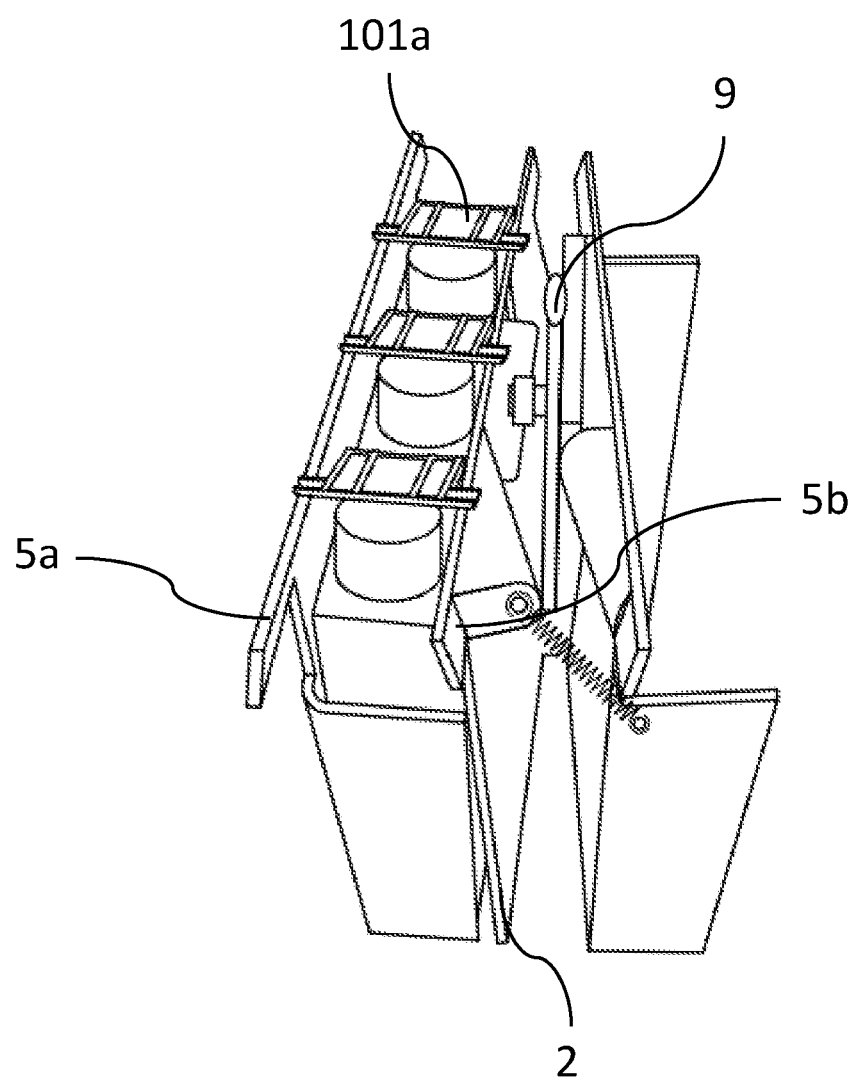
Figure 21:
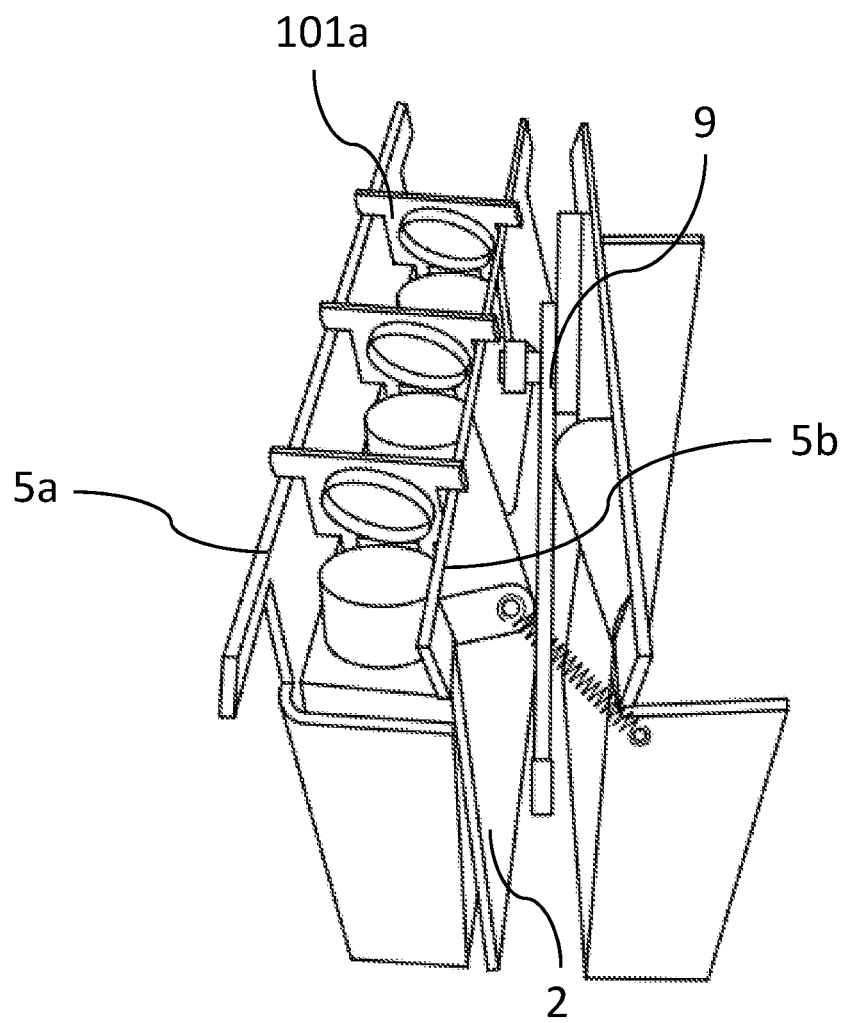
Figure 22:
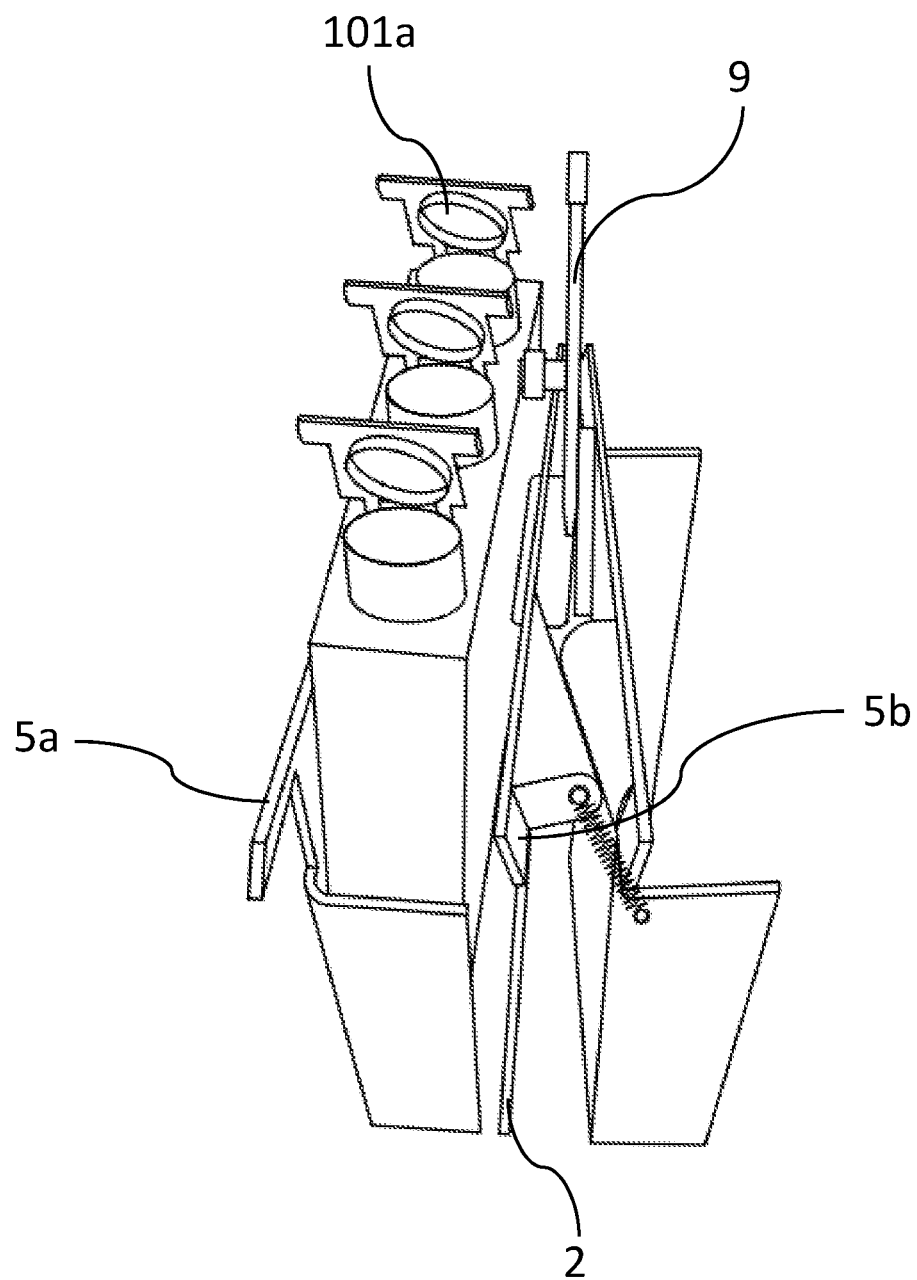

This function is illustrated in the sequence shown in FIGS. 16-22. FIG. 16 shows the second wall 2 (i.e., the movable wall in the example) being pivoted outwards to establish the open configuration of the receptacle. As can be seen, an opening of the receptacle formed by the wall assembly can be widened as a result of the outward pivot of the second wall 2. FIGS. 19-21 show the second wall 2 in a closed configuration of the container. In this closed configuration, the second wall 2 can be pivoted inwards. As a result, the receptacle formed by the wall assembly can assume the closed configuration in which an opening of the receptacle can be narrowed.

The actuator 9 can be further configured to move the first or second wall 1, 2 between the first open configuration for receiving the vessel and the second closed configuration. In the example, the actuator 9 can push the second wall 2 inwards. This movement can be effected in a single operation together with translating the vessel 100. For example, the actuator 9 can push the second wall 2 inwards first while the operator can rotate the actuator 9 before the actuator engages with the pusher 3 as discussed above to translate the vessel 100.

As can be seen, e.g., in FIG. 19, pivoting the second wall 2 into a closed position can result in placing the engagement elements 5a, 5b of the first wall and the second wall 2 in a position so that the engagement elements 5a, 5b can engage with the covers 101a of the vessel and open them when the vessel is translated as described above.

Returning to FIG. 16, the second wall 2 can be biased open by a second biasing element 21 to keep the second wall 2 in the first open configuration. When the second wall is pivoted into the closed configuration (see FIG. 21), the second biasing element 21 can generate a force to return the second wall 2 into the first open configuration. In the example, the second biasing element 21 can be a spring that can be strained when the second wall 2 is moved into the second closed configuration. As discussed, the actuator 9 can push the second wall 2 into the second closed configuration and thus can strain the spring 21 and prevent the spring from returning the second wall 2 to the second open configuration. As soon as this restraining force by the actuator 9 is lifted (e.g., the actuator 9 is rotated backwards) the spring 21 can return the second wall 2 into the second open configuration (see again FIG. 21).

At the same time, moving the second wall 2 from the second closed configuration to the first open configuration can release the resilient elements 8b, 8c of the platform 7, which can translate the platform to move the vessel 100 from the second position in the direction of the first position to allow removing the vessel from the container. This is also depicted in FIG. 21.

In the example container, the first wall 1 can be configured to be stationary relative to the second wall.

Additional embodiments of the components of the container will be discussed in the subsequent sections.

Figure 8:
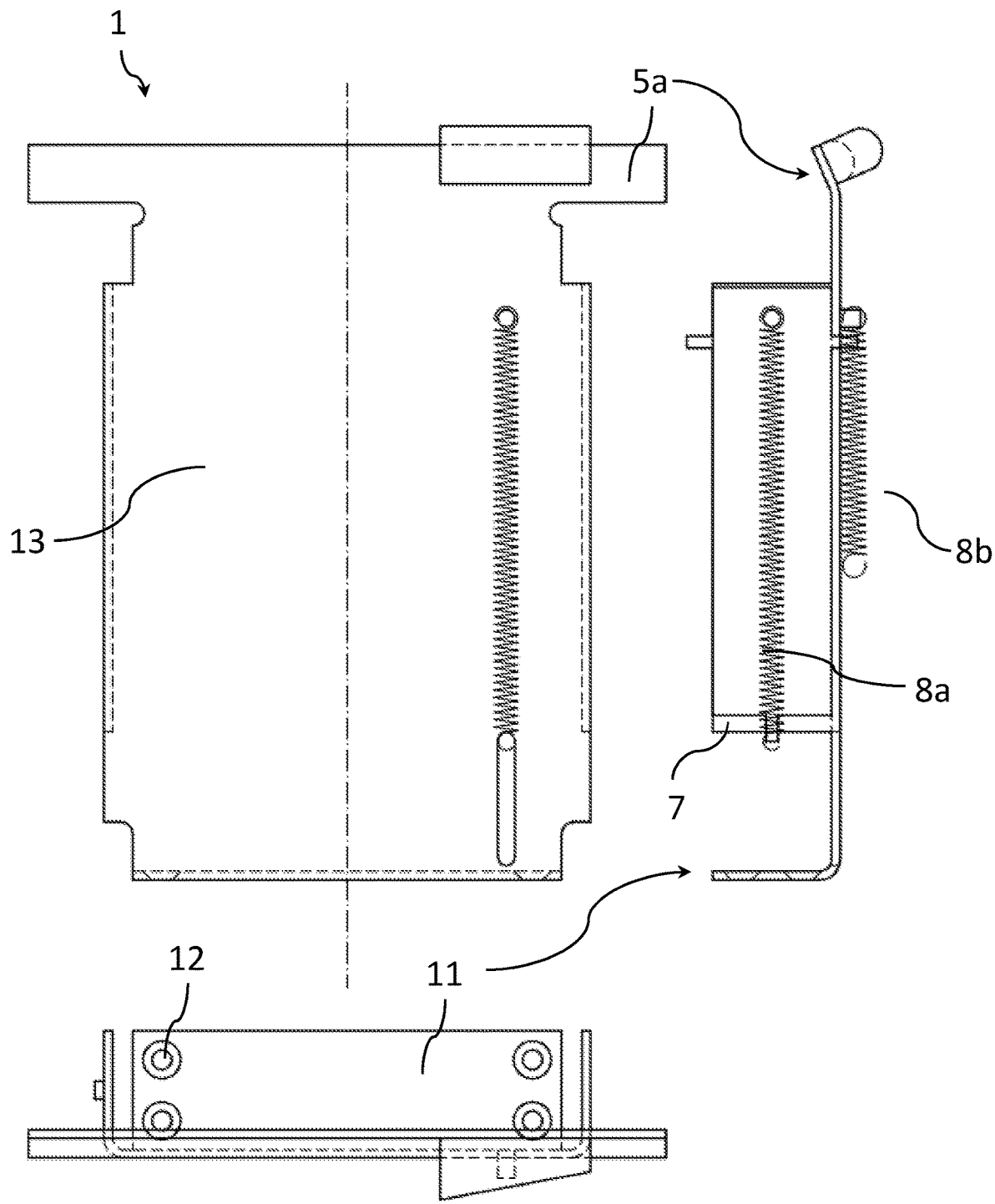
FIGS. 8-12 illustrate components of a container for vessels according to an embodiment of the present disclosure.
Figure 9:
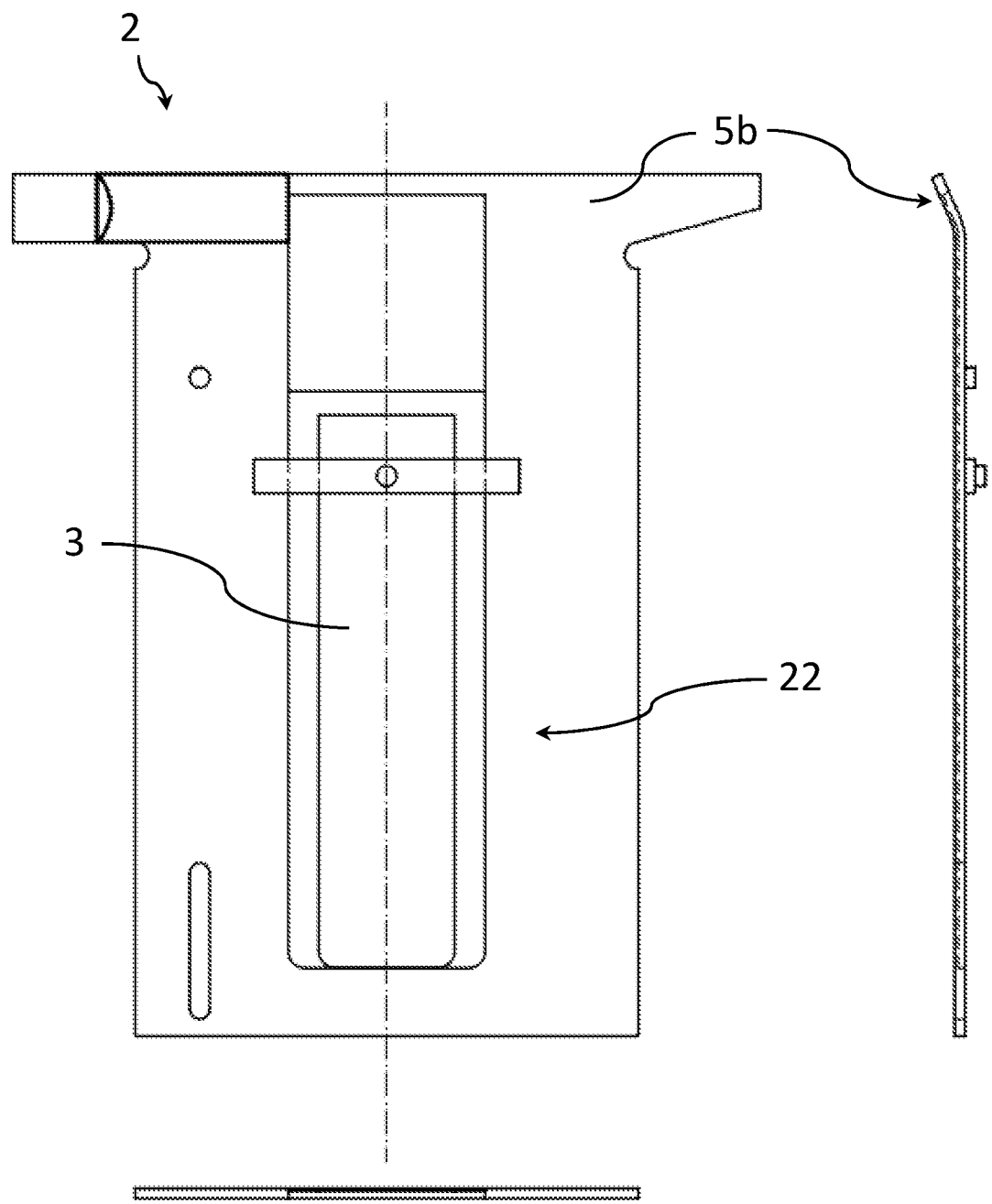

As can be seen in FIGS. 8 and 9, both the first wall 1 and the second wall 2 can have an engagement element 5a, 5b. The engagement elements 5a, 5b can be configured to engage with the lids, or covers, of the vessels, e.g., from different sides of the vessel. The engaging elements 5a, 5b can be an inwardly canting elements configured to engage with the lids, or covers. For example, the engagement elements can be inwardly canted lips as shown in FIGS. 8 and 9. In this manner, the receptacle can provide a narrow point at its opening (when the receptacle is in the closed configuration) for engaging with the lids, or covers, of the vessel while the vessel translates from the first into the second position. The engagement elements 5a, 5b can be arranged to open multiple covers, or lids, of a vessel simultaneously.

In other examples, only the first wall 1 or only the second wall 2 can be equipped with an engagement element. In addition or alternatively, each lid, or cover, can be opened by a single engagement element.

Even though the inwardly canted lids in FIGS. 8 and 9 can have particular advantages, the one or more engagement elements can also be configured differently in other examples. For instance, an engagement element can be a protrusion or extension reaching from the first and/or the second wall inwards to engage with a lid, or cover, of the vessel if the vessel translates from the first position to the second position. The engagement elements can be formed in an integral manner with the first or second walls, or can be attached as a separate element in other examples.

FIG. 8 can also show additional features of the first wall 1 and the platform 7.

Figure 11:
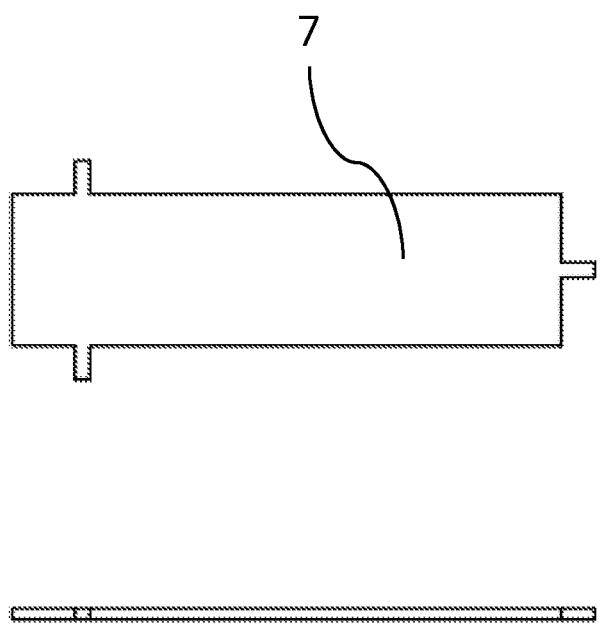

As discussed above, the platform can be connected to the first wall 1 by resilient elements 8a, 8b, 8c (e.g., springs—spring 8c is not shown in FIG. 8). As depicted in FIG. 11, the platform 7 can be a plate shaped element having a plurality of fastening extensions (e.g., three in FIG. 11) for connecting the respective resilient elements 8a, 8b, 8c to the platform. In addition, the first and second walls can be equipped with slots to which the fastening extensions of the platform 7 extend (see, e.g., FIG. 8 showing two slots in the first wall 1 and FIG. 9 showing a slot in the second wall 2 which receive the three fastening extension of platform 7). The fastening extensions can slide upwards and downwards in the slots during translation of the platform.

The platform can be formed differently in other examples. For instance, instead of a plate-shaped element supporting the vessel, the platform can be formed by one or more protruding elements extending into the receptacle formed by the first and second walls and supporting the vessel.

In the example of the figures, the first wall 1 can be formed from a bent sheet material, e.g., a metal sheet. The first wall 1 can have a back element 13, a bottom element 11 and two side elements top provide part of the receptacle for receiving the vessel. The first wall can be manufactured by comparatively simple dicing and bending operations.

In some examples, the bottom element can be provided with a fastener 12 for attaching the container to a deployment location. For instance, the bottom element 11 of the first wall 11 can include one or more sunk holes 12 to receive fastening elements for stationary fastening the container.

Figure 10:
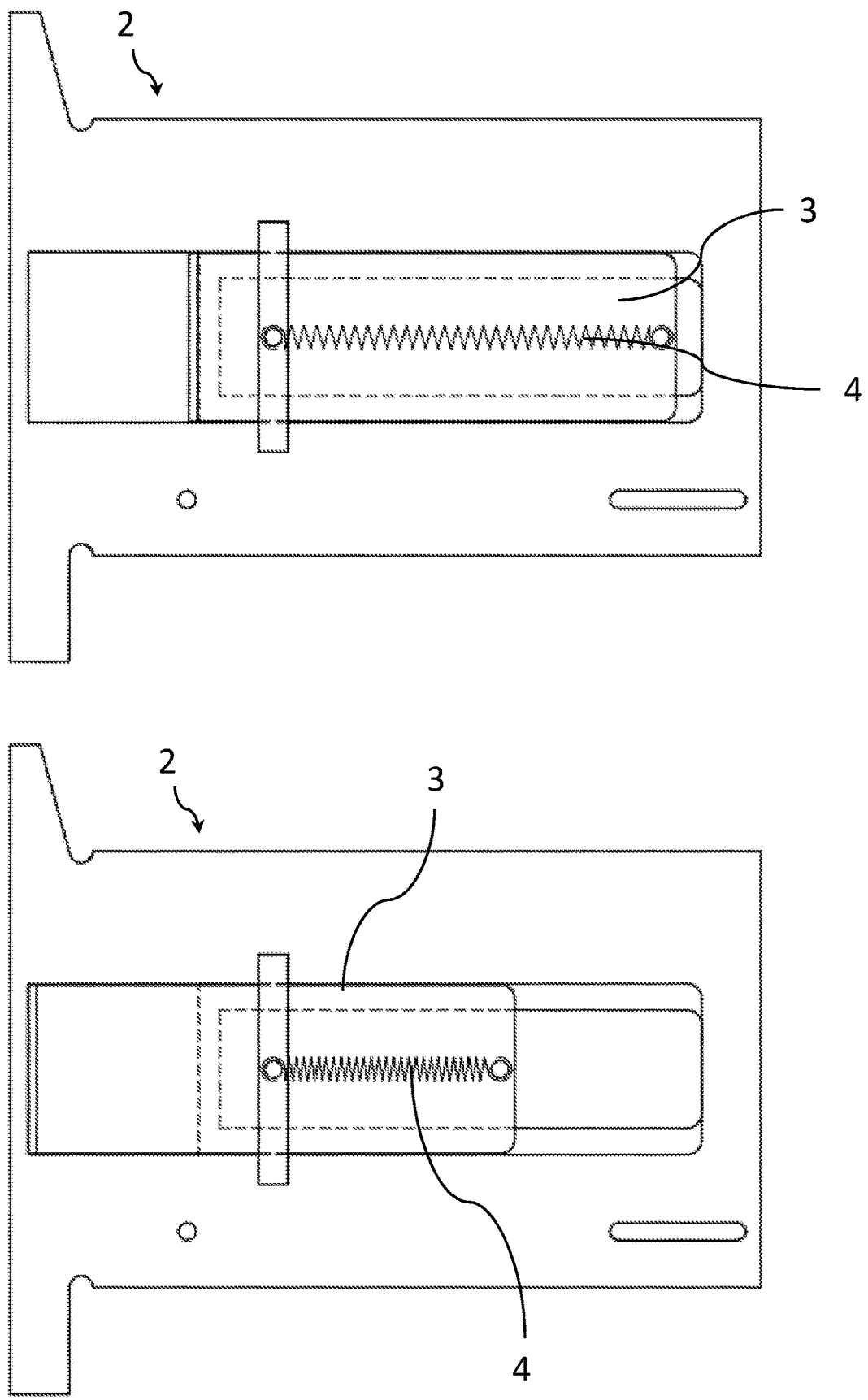

FIGS. 9 and 10 show the second wall 2 including the pusher 3. The second wall 2 can comprise a wall element 22. The wall element 22 can be formed of a sheet material (e.g., a metal sheet). The wall element can be provided with a cut-out to receive the pusher 3.

As discussed above, the pusher 3 can be translatable by the actuator to move the vessel from the first into the second position.

Figure 12:
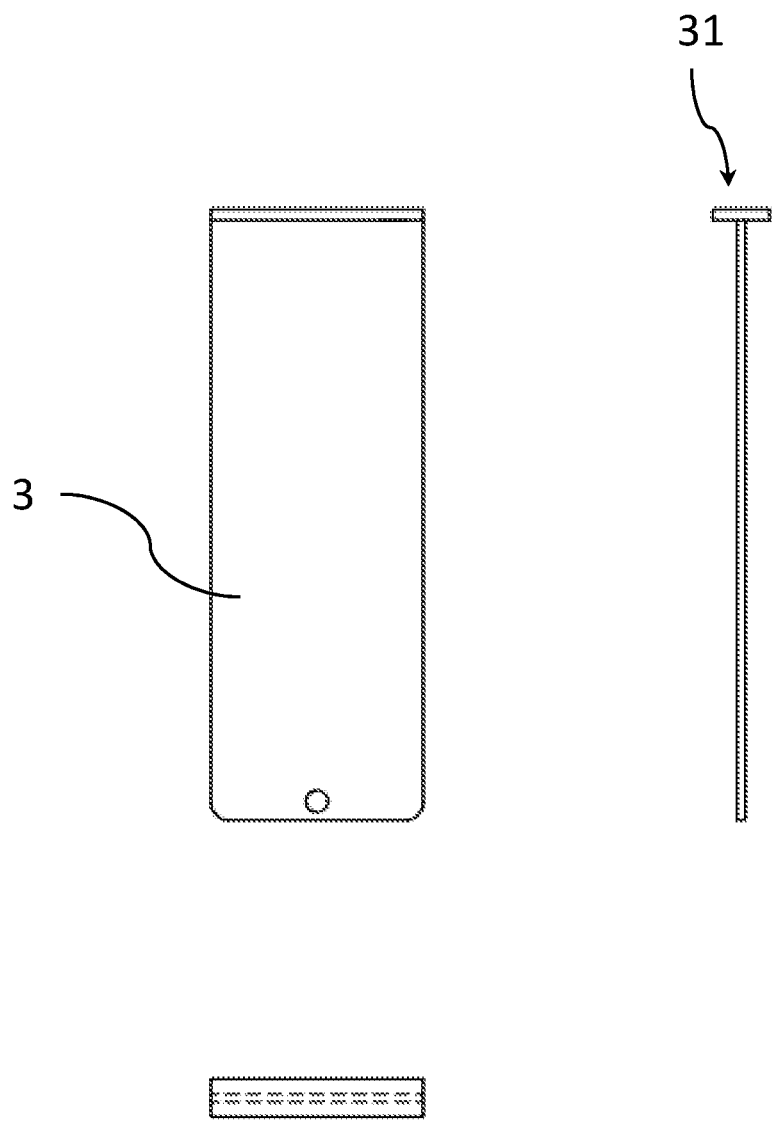
Figure 14B:
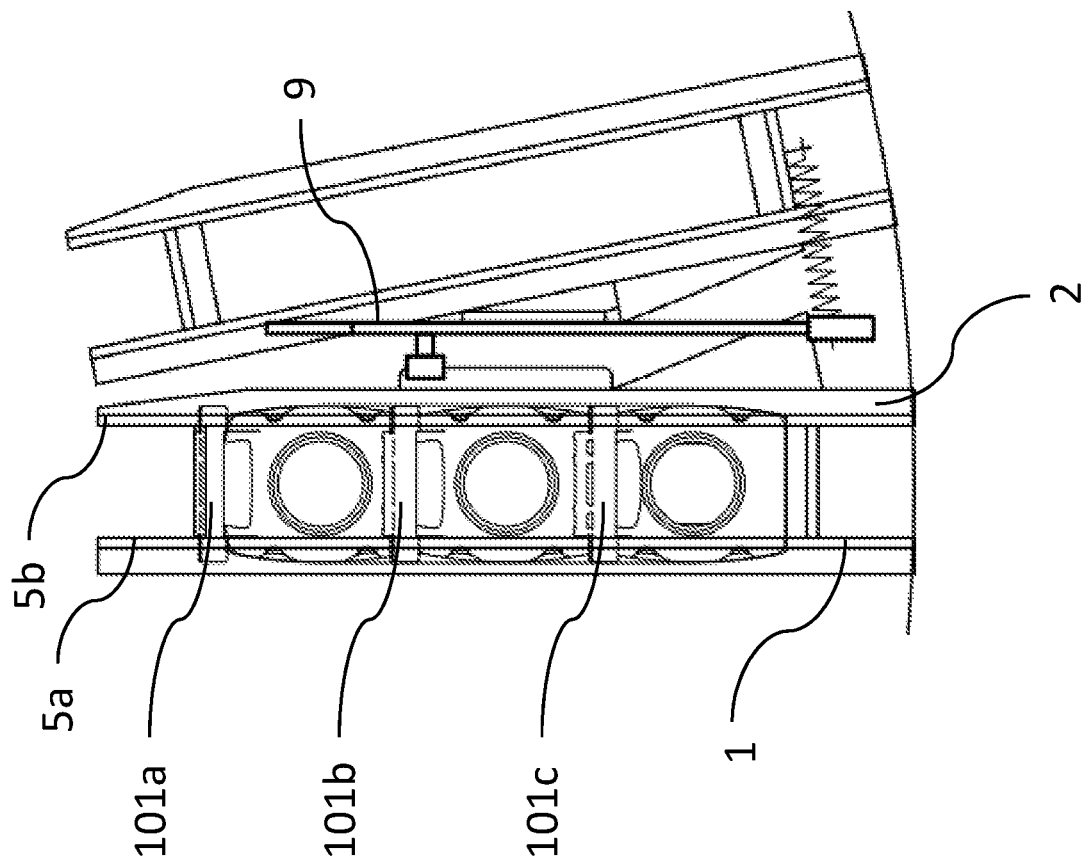
Figure 14A:
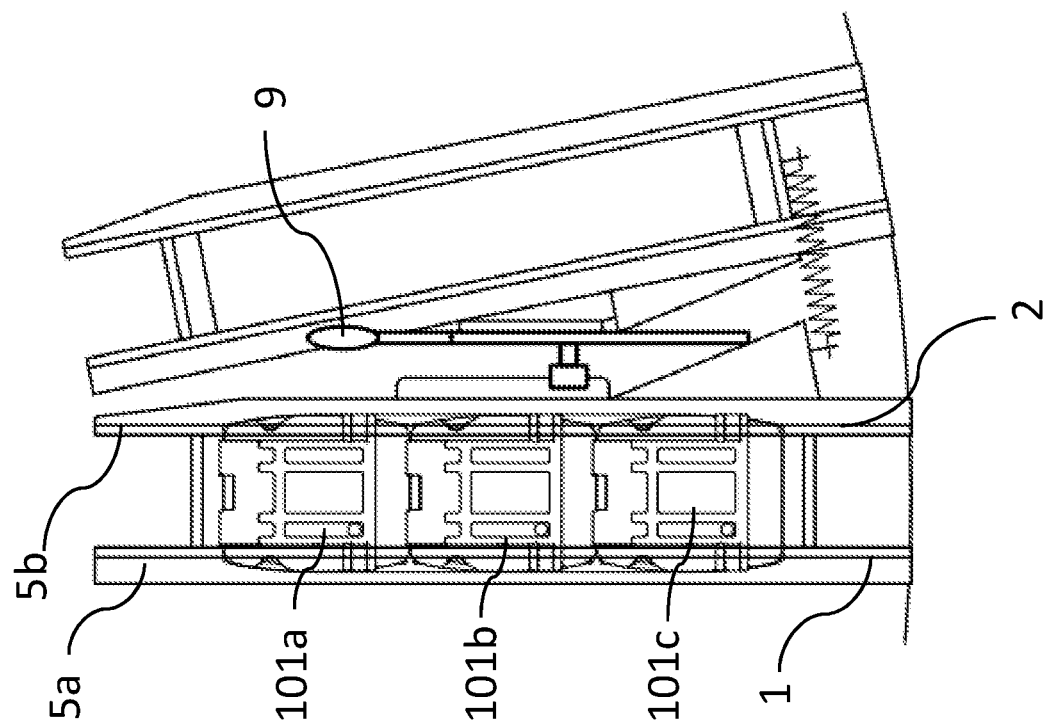
Figure 15:
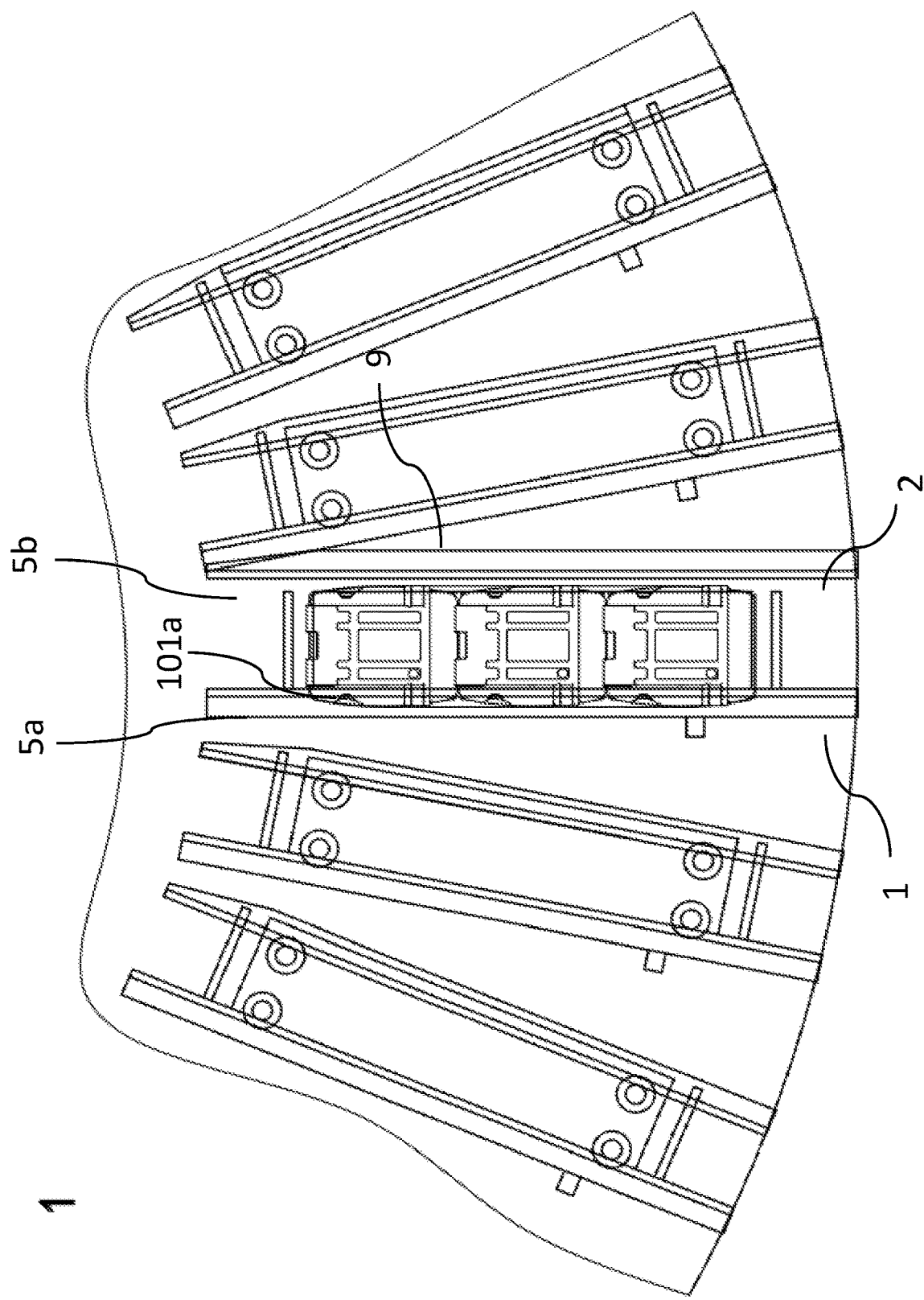

The translatable pusher 3 can comprise an engaging component to engage with the vessel to translate the vessel from the first position to the second position. In some examples, the engaging component can be configured to push on a shoulder of the vessel. An example of engaging component 31 in the form of a plate element is shown in FIG. 12, which depicts the pusher in isolation. The engaging component 31 can be configured to disengage from the vessel when the second wall 2 moves from the second closed to the first open configuration thereby 30 releasing the vessel. In the example, the second wall 2 can pivot into the first open position thereby disengaging the engaging component 31.

As can be further seen in FIG. 10, the translatable pusher can be connected to the respective first wall or the second wall by a biasing element 4 (e.g., a spring) which biases the translatable pusher towards the first pusher position. The biasing element 4 can be arranged to be in a more relaxed state when the pusher 3 is in an upper position (i.e., prior to engaging with the vessel). Accordingly, the biasing element can be in a more biased state when the pusher 3 has pushed the vessel into the second position (a lower position in the examples of the figures).

Further Embodiments of the Container

The containers of the present disclosure can have one or more additional features.

In some examples, the actuator can be configured to latch when the vessel is in the second position (and, in some examples, when the container is in the second closed configuration). For example, the actuator 9 can latch when the vessel has been pushed downward by the latch and when the second wall 2 has pivoted into the closed configuration as shown in FIG. 19. In this manner, the actuator 9 can remain in a position for keeping the vessel into the second position and for keeping the second wall in the closed configuration. The latch can be configured to be released by moving the actuator (e.g., in rotational direction opposite to the rotation direction for moving the vessel downwards).

In addition or alternatively, the container can comprise a stop (not shown in the figures) to stop movement of the actuator when the vessel is in the second position.

In addition or alternatively, the container can be configured to lock the vessel in a defined position relative to a first direction when the wall assembly is in the second closed position. For example, the first wall and the second wall 1, 2 can lock the vessel in a defined position relative to a first direction. The first direction can be substantially perpendicular to a translation direction of the vessel (i.e., a first horizontal direction in the example container of the figures). For instance, the first and second walls 1, 2 can engage with respective sidewalls of the vessel to lock the vessel in a first horizontal direction.

Moreover, the container can comprise a positioning element (not shown in the figures) configured to lock the vessel in a defined position relative to a second direction substantially orthogonal to the first direction. The second direction can be substantially perpendicular to a translation direction of the vessel and the first direction (i.e., a second horizontal direction in the example container of the figures). For example, the positioning element can comprise one or more leaf springs or other resilient elements for locking the vessel in the second direction.

Alternative Configurations of the Container

A particular arrangement of a container according to the present disclosure has been discussed above in connection with the figures. However, the containers of the present disclosure can be varied in different ways.

For example, while an actuator has been shown which effects the various movements by rotation, the actuator can be a translatable actuator in some examples.

Such translatable actuator can be, e.g., employed in a modified version of the container shown in FIG. 1. For example, the translatable actuator can include a pushing element, which can be configured to move downwards. The translatable actuator can then engage with the second wall 2 to move the second wall 2 into the closed configuration (e.g., to pivot the second wall 2 inwards). In addition or alternatively, the translatable actuator can engage with the pusher 3 and translate the pusher 3 downwards to move the vessel from the first position to the second position. In other examples, the pushing element can directly engage with the vessel 100 to push the vessel downwards.

In some examples, the container can include a safety catch, which can be activated when the vessel is moved into the second position. A further push on the actuator (or a different manipulation by an operator) can release the safety catch to i) release the platform and ii) the first or second wall. In this manner, as discussed above, the vessel can be moved upwards towards the first position (so that an operator can remove the vessel from the container).

In still other examples, the arrangement of the first wall 1 and the second wall 2 can be reversed or partially reversed. For example, the pusher can be connected to the first wall in some examples. In addition or alternatively, the different components can be arranged differently than shown in the figures. For instance, the platform 7 can be connected only to the first wall 1 or only to the second wall 2.

In still other examples, the first wall can be moveable (e.g., pivotable) to move the wall assembly between the first open configuration and the second closed configuration.

In the figures, the different biasing elements and resilient elements can be springs. However, in other examples, the biasing elements and resilient elements can be any other resilient element, which is suitable to be effect the respective movement. In addition, instead of elements that are stressed and then move towards a more relaxed state upon removal of the stress, biasing elements and resilient elements, which are compressed, and move back to a less compressed state can be used in other examples.

The container can be configured to detect when vessel is inserted in a wrong orientation. In other examples, the container can be configured so that the vessel can only be inserted in a single orientation.

The actuator can be equipped with a signaling element to indicate to an operator that the actuator has been manipulated to open the covers or lids (or not). For instance, the gripping element 91 or some other portion of the actuator can be colored in a signaling color to make noticing that the actuator has been manipulated (or not) easier.

The example container can include a pusher to push the vessel from the first position into a second position. However, in other examples the actuator can engage directly with the vessel to translate the vessel from the first position into a second position.

The example container can be moved in a vertical direction in the de-capping operation. In other examples, the container can be moved in a different direction when using the techniques of the present disclosure (e.g., in a horizontal or in a diagonal direction).

Integration in Automated Analyzers

In general, any number of containers can be integrated into an automated analyzer (e.g., the automated analyzers discussed above). In one example, as shown in FIGS. 13A-15, the automated analyzer can include a rotor for storing vessels. The one or more of the containers can be arranged on the rotor. The one or more containers can be arranged in an area for storing or handling reagents. However, in other examples, the vessels can also contain other consumables than reagents (as discussed above). For example, the vessels can contain quality control samples or internal standards. In still other examples, the vessels can include samples to be analyzed by the analyzer (e.g., patient samples).

In some examples, the automated analyzer can have a sensor configured to detect that actuator has not been actuated to translate the vessels into the second position (i.e., to open the lids). For instance, an optical, magnetic or electric sensor can be provided to detect a position of the actuator 9.

Further Embodiments

A number of embodiments of the containers of the present disclosure have been discussed in the preceding sections. In addition, the containers of the present disclosure can also be carried out according to the following embodiments.

A container for receiving vessels for use in an automated analyzer is presented. The container can comprise a wall assembly including a first wall and a second wall. The wall assembly can form a receptacle for receiving a vessel having one or more covers, or lids. At least one of the first and second walls can be moveable to provide a first open configuration for receiving the vessel and a second closed configuration. The container can further comprise an actuator. The actuator can be configured to translate the vessel from a first position after being received in the container to a second position. The wall assembly in the second closed configuration can be positioned so that at least one engaging element attached to the wall assembly can engages with the covers, or lids, of the vessel to open the covers, or lids, while the vessel is being translated by the actuator from the first position to the second position.

The actuator can be further configured to move the first or second wall between the first open configuration for receiving the vessel and the second closed configuration such as, for example, in a single operation together with translating the vessel.

The actuator can be a manually operable actuator.

The actuator can be further configured to move the first or second wall from the second closed configuration to the first open configuration to allow removing the vessel from the container.

The container can further comprise a platform supporting the vessel in the second position. The platform can be connected to the container by a resilient element such as, for example, a spring, which can be biased when the vessel is supported in the second position.

Moving the first or second wall from the second closed configuration to the first open configuration can release the resilient element, which can translate the platform to move the vessel from the second position in the direction of the first position to allow removing the vessel from the container.

The translation from the first position to the second position and from the second position towards the first position can happen in a vertical direction.

The engaging element can be an inwardly canting element configured to engage with the lids, or covers.

Both of the first and second walls can comprise at least one engaging element for engaging with the lids, or covers, of the vessels such as, for example, from different sides of the vessel.

The at least one engaging element can be arranged to open multiple covers, or lids, of a vessel simultaneously.

The first wall or the second wall can comprise a translatable pusher. The actuator can actuate the translatable pusher to translate the vessel from the first position to the second position by moving from a first pusher position to a second pusher position. The translatable pusher can comprise an engaging component to engage with the vessel to translate the vessel from the first position to the second position. The engaging component can be configured to push on a shoulder of the vessel.

The translatable pusher can be connected to the respective first wall or the second wall by a biasing element, which can bias the translatable pusher towards the first pusher position. The engaging component can disengage from the vessel when the first or second wall moves from the second closed to the first open configuration thereby releasing the vessel.

The second wall can be pivotable relative to the first wall to move the first wall between the first open configuration for receiving the vessel and the second closed configuration. The second wall can be biased open by a second biasing element to keep the second wall in the first open configuration.

The first wall can be configured to be stationary relative to the second wall. The first wall can comprise one or more sunk holes to receive fastening elements for stationary fasten the container.

The actuator can be rotatably arranged.

The actuator can be translatably arranged.

The actuator can be configured to engage with the first or second wall to push the respective one of the walls inward to move the container into the closed second configuration.

The actuator can be configured to come into engagement with the translatable pusher to translate the vessel from a first position after being received in the container to a second position.

The actuator can be configured to latch when the vessel is in the second position. The latch can be configured to be released by moving the actuator.

The container can further comprise a stop to stop movement of the actuator when the vessel is in the second position.

The container can be configured to lock the vessel in defined position relative to a first direction when the first or second wall is in the second closed position.

The container can further comprise a positioning element configured to lock the vessel in a defined position relative to a second direction orthogonal to the first direction.

The vessel can have multiple covers, or lids.

An automated analyzer comprising one or more of the above containers is also disclosed.

The automated analyzer can comprise a rotor for storing vessels. The one or more of the containers can be arranged on the rotor. The one or more containers can be arranged in an area for storing or handling reagents.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A container for receiving vessels for use in an automated analyzer, the container comprising:
    a wall assembly including a first wall and a second wall, wherein the wall assembly forms a receptacle for receiving a vessel having one or more covers and wherein at least one of the first and second walls is moveable to provide a first open configuration for receiving the vessel and a second closed configuration; and
    an actuator, wherein the actuator is configured to translate the vessel from a first position after being received in the container to a second position and wherein the wall assembly in the second closed configuration is positioned so that at least one engaging element attached to the wall assembly engages with the covers of the vessel to open the covers while the vessel is being translated by the actuator from the first position to the second position.

2. The container of claim 1, wherein the actuator is further configured to move the first or second wall between the first open configuration for receiving the vessel and the second closed configuration.

3. The container of claim 2, wherein the actuator is configured to move the first or second wall between the first open configuration for receiving the vessel and the second closed configuration in a single operation together with translating the vessel.

4. The container of claim 1, wherein the actuator is a manually operable actuator.

5. The container of claim 1, further comprising,
a platform supporting the vessel in the second position.

6. The container of claim 4, wherein the platform is connected to the container by a resilient element, which is biased when the vessel is supported in the second position.

7. The container of claim 6, wherein the resilient element is a spring.

8. The container of claim 6, wherein moving the first or second wall from the second closed configuration to the first open configuration releases the resilient element, which translates the platform to move the vessel from the second position in the direction of the first position to allow removing the vessel from the container.

9. The container of claim 1, wherein the engaging element is an inwardly canting element configured to engage with the covers.

10. The container of claim 1, wherein the at least one engaging element is arranged to open multiple covers of a vessel simultaneously.

11. The container of claim 1, wherein the first wall or the second wall includes a translatable pusher, wherein the actuator actuates the translatable pusher to translate the vessel from the first position to the second position by moving from a first pusher position to a second pusher position.

12. The container of claim 11, wherein the translatable pusher includes an engaging component to engage with the vessel to translate the vessel from the first position to the second position.

13. The container of claim 1, wherein the second wall is pivotable relative to the first wall to move the first wall between the first open configuration for receiving the vessel and the second closed configuration.

14. The container of claim 1, wherein the actuator is rotatably or translatably arranged.

15. The container of claim 1, wherein the actuator is configured to engage with the first or second wall to push the respective one of the walls inward to move the container into the closed second configuration.

16. The container of claim 1, wherein the actuator is configured to latch when the vessel is in the second position.

17. The container of claim 16, wherein the latch is configured to be released by moving the actuator.

18. An automated analyzer comprising one or more of the containers of claim 1.

19. The automated analyzer of claim 18, further comprising,
a rotor for storing vessels, wherein the one or more of the containers are arranged on the rotor.

* * * * *